US012094004B2

(12) United States Patent
Millhuff et al.

(10) Patent No.: US 12,094,004 B2
(45) Date of Patent: *Sep. 17, 2024

(54) DYNAMIC CIRCUIT BREAKER

(71) Applicant: Chicago Mercantile Exchange Inc., Chicago, IL (US)

(72) Inventors: Paul Alan Millhuff, Tinley Park, IL (US); John Paul Scheerer, Frankfort, IL (US); Neil Andrew Lustyk, Chicago, IL (US); Supreet Dhillon, Northbrook, IL (US); James Allen Bailey, Western Springs, IL (US); Julie Holzrichter, Chicago, IL (US)

(73) Assignee: Chicago Mercant Exchange Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/372,172

(22) Filed: Sep. 25, 2023

(65) Prior Publication Data

US 2024/0013297 A1    Jan. 11, 2024

Related U.S. Application Data

(63) Continuation of application No. 18/101,162, filed on Jan. 25, 2023, now Pat. No. 11,803,913, which is a
(Continued)

(51) Int. Cl.
*G06Q 30/00* (2023.01)
*G06Q 20/10* (2012.01)
(Continued)

(52) U.S. Cl.
CPC .......... *G06Q 40/04* (2013.01); *G06Q 20/108* (2013.01); *G06Q 30/0635* (2013.01)

(58) Field of Classification Search
None
See application file for complete search history.

(56) References Cited

U.S. PATENT DOCUMENTS 7,039,610 B2    5/2006    Morano et al.
7,356,499 B1    4/2008    Amburn
(Continued)

FOREIGN PATENT DOCUMENTS

EP         3522098 A1       8/2019

OTHER PUBLICATIONS

Extended European Search Report, from EP Application No. 20212812, Apr. 19, 2021, EP.

*Primary Examiner* — Mila Airapetian
(74) *Attorney, Agent, or Firm* — Lempia Summerfield Katz LLC

(57) ABSTRACT

A computer implemented method for controlling operational states of a hardware matching processor includes monitoring, by a circuit breaker, incoming electronic data transaction request messages to the hardware matching processor; dynamically defining a range of values as a function of values included with electronic data transaction request messages received during a rolling lookback window; detecting that an incoming electronic data transaction request message contains a value outside the range of values; transitioning the electronic data transaction processing system into a pre-open state for a predetermined period, thereby preventing the hardware matching processor from matching incoming electronic data transaction request messages; calculating a pre-open value at an end of the pre-open state; and re-opening the electronic data transaction processing system at the calculated pre-open value, thereby allowing the hardware matching processor to match incoming electronic data transaction request messages.

25 Claims, 7 Drawing Sheets

Related U.S. Application Data continuation of application No. 17/525,380, filed on Nov. 12, 2021, now Pat. No. 11,593,881, which is a continuation of application No. 16/719,252, filed on Dec. 18, 2019, now Pat. No. 11,205,226.

(51) Int. Cl.
  *G06Q 30/0601* (2023.01)
  *G06Q 40/04* (2012.01)

(56) References Cited

U.S. PATENT DOCUMENTS

| | | |
|---|---|---|
| 7,430,533 B1 | 9/2008 | Cushing |
| 7,831,491 B2 | 11/2010 | Newell et al. |
| 7,853,499 B2 | 12/2010 | Czupek et al. |
| 8,660,936 B1 | 2/2014 | Banke et al. |
| 11,049,182 B2 | 6/2021 | Pierce et al. |
| 11,068,979 B1 | 7/2021 | Givot |
| 2004/0024713 A1 | 2/2004 | Moore et al. |
| 2005/0096999 A1 | 5/2005 | Newell et al. |
| 2005/0203826 A1 | 9/2005 | Farrell et al. |
| 2009/0094151 A1 | 4/2009 | Mortimer et al. |
| 2014/0006243 A1 | 1/2014 | Boudreault et al. |
| 2015/0073962 A1 | 3/2015 | Bixby et al. |
| 2015/0161727 A1 | 6/2015 | Callaway et al. |
| 2017/0293973 A1 | 10/2017 | Lustyk |
| 2017/0331774 A1 | 11/2017 | Peck-Walden et al. |
| 2019/0005582 A1 | 1/2019 | Kapur |
| 2019/0392518 A1 | 12/2019 | Bonig et al. |

| QTY | BID | ASK | QTY |
|---|---|---|---|
| | | 1000 | 5 |
| | | 1000 | 10 |
| | | 999 | 5 |
| | | 998 | 5 |
| | | 998 | 10 |
| | | 997 | 5 |
| | | 997 | 10 |
| | | 995 | 5 |
| | | 994 | 5 |
| 5 | 991 | 993 | 10 |
| 10 | 990 | | |
| 5 | 988 | | |
| 5 | 988 | | |
| 5 | 988 | | |
| 10 | 987 | | |
| 5 | 987 | | |
| 5 | 985 | | |
| 10 | 984 | | |
| 5 | 984 | | |

ASK LIMIT 501
BID LIMIT 503
500

Fig. 6

DYNAMIC CIRCUIT BREAKER

REFERENCE TO RELATED APPLICATIONS

This application is a continuation under 37 C.F.R. 1.53(b) of U.S. patent application Ser. No. 18/101,162 filed Jan. 25, 2023, now U.S. Pat. No. 11,803,913, which is a continuation under 37 C.F.R. 1.53(b) of U.S. patent application Ser. No. 17/525,380 filed Nov. 12, 2021, now U.S. Pat. No. 11,593,881, which is a continuation under 37 C.F.R. 1.53(b) of U.S. patent application Ser. No. 16/719,252 filed Dec. 18, 2019, now U.S. Pat. No. 11,205,226, which are hereby incorporated by reference in their entirety and relied upon.

BACKGROUND

Current financial instrument trading systems allow traders to submit orders and receive confirmations, market data, and other information electronically via a communications network. Electronic trading of financial instruments, such as futures contracts, is conducted by market participants sending orders, such as to buy or sell one or more futures contracts, in electronic form to the exchange. These electronically submitted orders to buy and sell are then matched, if possible, by the exchange, i.e., by the exchange's matching engine, to execute a trade. Outstanding (unmatched, wholly unsatisfied/unfilled or partially satisfied/filled) orders are maintained in one or more data structures or databases referred to as "order books," such orders being referred to as "resting," and made visible, i.e., their availability for trading is advertised, to the market participants through electronic notifications/broadcasts, referred to as market data feeds. An order book is typically maintained for each product, e.g., instrument, traded on the electronic trading system and generally defines or otherwise represents the state of the market for that product, i.e., the current prices at which the market participants are willing to buy or sell that product, as well as the desired quantities therefore. The collection of quantities available to buy or sell at different prices may be reflective of the product's liquidity, i.e., the ease with which a willing seller may find a willing buyer and vice versa.

The speed in which trades are executed through electronic trading systems provide many benefits. Electronic trading systems can facilitate enormous numbers of market transactions. In many cases, the greater the number of orders sent to a market, the greater that market's liquidity. In liquid markets, prices are driven by competition and reflect a consensus of a contract's value. With the advent of improved computational and communications capabilities, the speed and efficiency with which traders may receive information and trade in electronic trading systems has greatly improved. Automated trading systems employed by market participants utilize computers to quickly analyze market information and place trades allowing traders to take advantage of even the smallest movements in prices. Accordingly, electronic trading has provided significant benefits to markets, including increasing liquidity, promoting price discovery, narrowing bid-ask spreads, and lowering risk management costs.

However, the improved speed and efficiency also increases the speed at which problems may occur and propagate, such as where the market ceases to operate as intended, e.g., the market no longer reflects a consensus of the value of traded products among the market participants, or experiences transitory liquidity gaps. Such problems are typically evidenced by extreme market activity such as large changes in price, whether up or down, over a short period of time or an extreme volume of trades taking place.

To mitigate risk and ensure a fair and balanced market, electronic trading systems need to provide mechanisms to rapidly detect and respond to situations where a market experiences sudden and extraordinary price movements, or otherwise where the market value is not reflective of a true consensus of the value of the traded products among the market participants, e.g., in situations where there is order imbalance and volatility due to news or events.

BRIEF DESCRIPTION OF THE DRAWINGS

FIG. 6 depicts an example order book.

DETAILED DESCRIPTION

Figure 1:
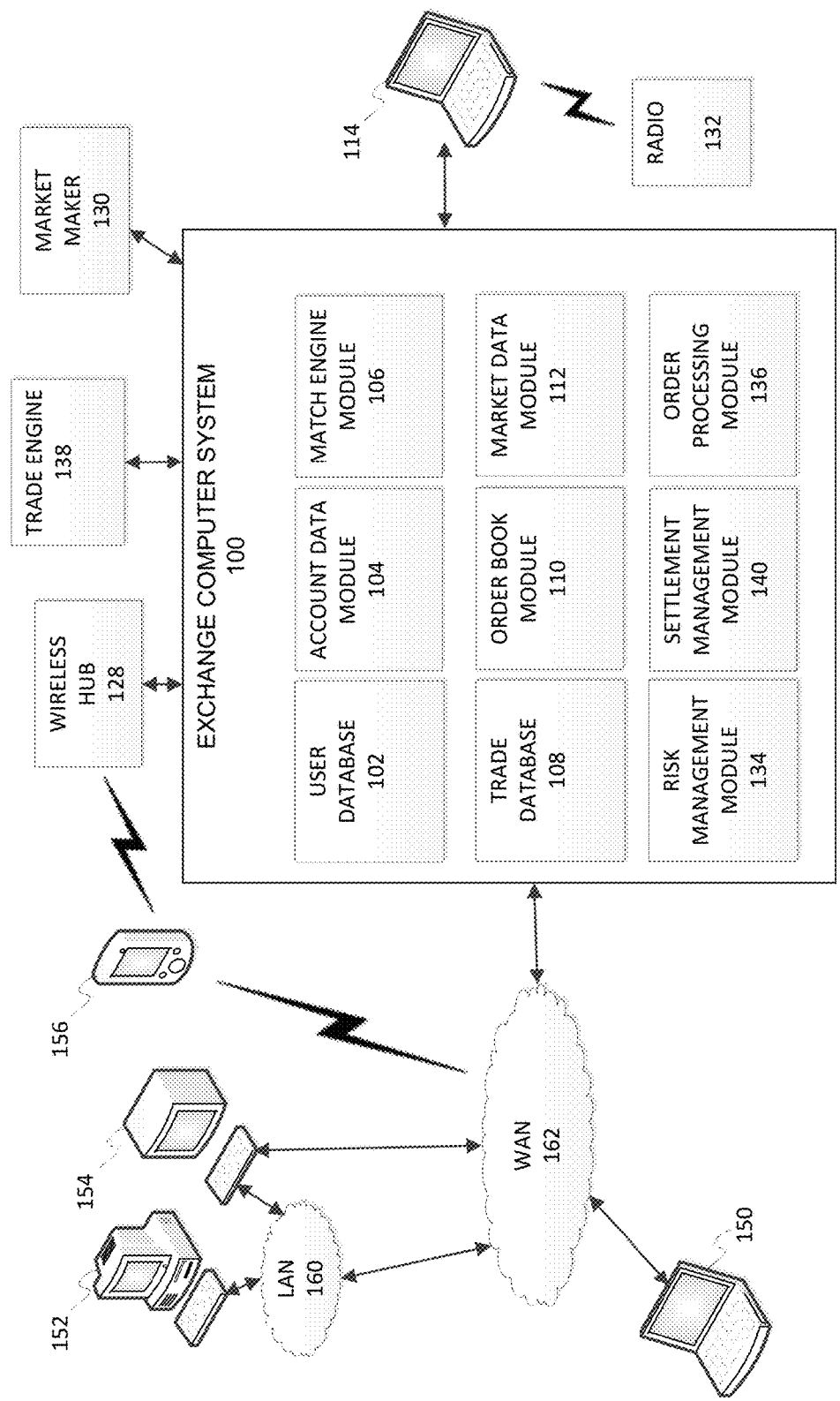
FIG. 1 depicts a computer network system, according to some embodiments.

The disclosed embodiments relate to mechanisms for dynamically detecting and responding to situations where objects in a computing system are associated with values or a change in values that are outside of one or more defined, e.g., acceptable, ranges over a time interval. For example, one exemplary environment where dynamic detection and mitigation is desirable is in financial markets, and in particular, electronic financial exchanges, such as a futures exchange, such as the Chicago Mercantile Exchange Inc. (CME).

The disclosed embodiments provide a technical benefit that solves a technical problem in electronic financial exchanges. Transactions have traditionally been handled manually, between brokers or counterparties. However, recently, most transactions have migrated to electronic trading platforms. Electronic trading platforms provide speed, efficiency, and security all in an easily accessible and efficient system. Electronic trading platforms, however, may introduce some issues and problems into trading systems. In particular, the increase in the use of automated trading systems to generate orders can create technical issues that may potentially extensively disrupt entire markets. The disclosed embodiments further solve a technical problem of generalized and reactive processing which provides macro-responses to general events after they have occurred and, instead, enable selective/tailored and preemptive/proactive functionality not previously available, thereby avoiding unnecessary processing and/or messages/communications.

Algorithmic trading (also referred to as algo-trading, automated trading, or black-box trading) is a mechanism to automate trading activities by using computers instead of humans to execute trades. Automated trading systems are directed by algorithms defined within the platform's programming language. Algorithmic trading is dependent upon the development of a comprehensive trading system. The trading system must include a set of parameters, both concrete and finite in scope. The parameters are a reflection of the adopted trading methodology, and in algorithmic trading, are based upon mathematical computations of varied complexity. High-frequency trading (HFT) is a type of algorithmic trading that uses powerful computers and high-speed communications networks to transact a large number of orders in fractions of a second. HFT uses complex algorithms to analyze multiple markets and execute orders based on market conditions. In some markets, the traders with the fastest execution speeds may be more profitable than traders with slower execution speeds.

In algorithmic trading, decisions are automated and happen in milliseconds. Both HFT and algorithmic trading have provided benefits such as an increase in volume, liquidity, and improved markets. Algorithmic trading systems rely upon hardware and software to be operational and error free during the execution of trades. Dedicated computers, servers, and Internet connections are required to facilitate proper function of the system. Intermittent outages in systems and connectivity may compromise a given trade's execution. Individual trades may be mismanaged or missed altogether as an ill-timed outage or bug may negatively impact an algorithmic system driven portfolio.

As a technical solution to some of these technical problems associated with HFT and algorithmic trading, electronic exchanges have implemented several integrity checks on markets to attempt to stop markets from experiencing the negative impacts of sudden and extraordinary price movements. Three example mechanisms are price bands, velocity logic, and circuit breakers.

Price banding may be used as a first line of defense for many exchanges. Price banding is, in one implementation, a mechanism that subjects all orders to price validation and rejects orders outside the given band to maintain orderly markets. Bands are calculated for each product based on the last price, plus or minus a fixed band value. Thus, if markets quickly move in one direction, the price bands adjust to accommodate new trading ranges.

Velocity logic is another integrity check which may be used by electronic exchanges that detects when a market for a particular product moves too quickly, either up or down, in too short a period of time, e.g., the velocity of the market exceeds a defined threshold limit. See, for example, U.S. Pat. No. 8,660,936, entitled "Detection and mitigation of effects of high velocity price changes" and U.S. patent application Ser. No. 15/091,626 entitled "Detection and mitigation of effects of high velocity value changes based upon match event outcomes", published as U.S. Patent Publication No. 2017/0293973 A1 the entire disclosures of which are incorporated by reference herein and relied upon.

Velocity logic, in one implementation, is configured to detect market movement of a predefined number of ticks either up or down within a predefined time. Velocity logic introduces a momentary suspension in trading by transitioning the instrument(s) and, in some implementations, related instruments to a suspended state. In operation, where a lead month instrument triggers a velocity logic event, if the lead month instrument belongs to an equities, metals, or FX instrument group, then the entire group may transition to the reserved state, otherwise only the lead month instrument transitions into a reserved/pause state. In the reserved state, options auto-reserve functionality may automatically pause matching in the associated options and options spread and combination markets and all resting mass quotes are canceled when the auto-reserve functionality is initiated. The reserved state may be maintained for a few seconds after the instrument has resumed trading. During the reserved state, participants can submit, modify, and cancel orders. Mass quotes are rejected. The pause allows the community a momentary opportunity to enter, modify, or cancel orders in order to re-establish the proper market prices.

Price limits and circuit breakers are also market integrity controls that monitor an instrument or market for significant price movements and take actions in the market to reduce the impact of the price movement. Price limits are used to set the maximum price range permitted for a contract in each trading session. The price limits may vary from product to product depending on the type of market. When markets hit the price limit, different actions may occur depending on the product being traded. For example, some markets may temporarily halt until price limits can be expanded or trading may be stopped for the day based on regulatory rules. Different futures contracts will have different price limit rules. As an example, equity index futures have different rules than agricultural futures. In an example, equity index futures have a three-level expansion: 7%, 13%, and 20% to the downside, and a 5% limit up and down in overnight trading. Agricultural futures like corn have a two-level expansion: $0.25 then $0.40. When prices in the markets reach any of these levels, the market will go limit up or limit down. Price limits are re-calculated daily and remain in effect for the entirety of the trading day except in certain physically deliverable markets where price limits may be lifted prior to expiration so that futures prices are not prevented from converging on prices for the underlying commodity.

Circuit breakers, also referred to as static or downstream circuit breakers, are implemented as regulatory price limits that halt the trading of a security or an index for a certain period. Circuit breakers are triggered when an instrument or market experiences a large percentage swing in either direction or, for example, a market index experiences a significant decline. Like price limits, circuit breakers are used to prevent excessive speculative gains or losses on a security or devastating losses in the markets. Circuit breaker limits were put in place after Black Monday in 1987 to reduce market volatility and massive selloffs, giving traders time to reconsider their transactions. New York Stock Exchange (NYSE) Rule 80B provides a methodology for determining when to halt trading in all stocks due to extraordinary market volatility, i.e., market-wide circuit breakers. Most markets include rules relating to market-wide circuit breakers that are designed to slow the effects of extreme price movement through coordinated trading halts across securities markets when severe price declines reach levels that may exhaust market liquidity.

In an example, pursuant to Rule 80B, a market-wide trading halt will be triggered if the S&P 500 Index declines in price by specified percentages from the prior day's closing price of that index. Presently, the triggers are set at three circuit breaker thresholds: 7% (Level 1), 13% (Level 2), and 20% (Level 3). A market decline that triggers a Level 1 or Level 2 circuit breaker after 9:30 a.m. ET and before 3:25 p.m. ET halts market-wide trading for 15 minutes, while a similar market decline at or after 3:25 p.m. ET does not halt market-wide trading. A market decline that triggers a Level 3 circuit breaker, at any time during the trading day, halts market-wide trading for the remainder of the trading day.

The trading halt provides the necessary break for market participants to incorporate and analyze the latest events before making further trading decisions. Current circuit breakers are static and located downstream from the electronic exchanges, i.e., they monitor the outgoing market data feed carrying data indicative of what has transpired in the market. These static circuit breakers are, as such, reactionary and generalized. As an example, the static/downstream circuit breakers sit outside of the trading platform and consume an anonymized, public market data feed. Accordingly, the ability of the static circuit breakers to respond to particular events is limited by the nature of information made available, e.g. responses based on the particulars of the market participants is not possible as this information is not provided in the anonymized market data feed. Furthermore, as downstream circuit breakers listen to the same data feed as the market participants, the market participants learn about market events generally around the same time that such events are input into static/downstream circuit breakers. Accordingly, these circuit breakers cannot, for example, intercept or otherwise prevent communications or messages from being sent to the market participants. Based upon information received (hard limits and order book updates), the downstream circuit breakers determine if a significant enough market move has occurred and instruct the trading platform to take action. As implemented, circuit breakers watch for one or more price fluctuation limits above and below a reference price. If a price fluctuation limit is met, a monitoring period initiates but trading continues within the price limits. At the end of the period, if a limit condition exists, the primary futures contract group and associated products go to pre-open for 2 minutes and the price fluctuation limits are expanded to a next level.

Since the downstream circuit breakers are outside of the trading platform, the possible actions a downstream circuit breaker can take are limited, and all possible actions are reactionary. The disclosed embodiments move the circuit breaker functionality into the trading platform. By having circuit breakers in line, the trading platform can perform more robust price movement monitoring and can take enhanced, e.g., selective/tailored, proactive, actions to limit or prevent the impact of the price movement. The embodiments improve transparency to the marketplace, improve the speed of decision via real time data processing, and limit the impact of unnecessary market halting events, e.g. minimize unnecessary communication of messages related thereto to the market participants.

In an embodiment, the dynamic circuit breakers monitor for significant price movements during a trading session. The dynamic circuit breakers define an upper and lower limit of how far the price of an instrument is allowed to move in a configured time interval. Each product has its own assigned percentage used to calculate the limits, which is a percentage value of its previous settlement price. The calculated variant is used throughout the course of the trading session. After market open, a rolling look-back window, which in one embodiment is 60 minutes in duration, calculates the upper and lower limits used by the dynamic circuit breakers. The high and low prices within the window plus or minus the variant determine the dynamic circuit breakers high bid and low ask limits during the open market state. If triggered in the primary contract market (lead month), in one embodiment all associated contract markets immediately transition into a pre-open state.

The disclosed embodiments evaluate values associated with messages for certain markets or contracts, which may be implemented as, or represented by, objects, i.e., data objects, in the exchange computing system. For example, the values that are evaluated may be associated with newly received or incoming messages, or with messages previously received by the system, such as messages comprising requests for transactions related to an object. In one embodiment, an administrator associated with an exchange computing system may determine which messages and values associated therewith are subject to the evaluation and prevention logic disclosed herein.

When applied to electronic trading systems, the disclosed embodiments may continually scan for, detect, and respond to changes, either up ("spike") or down ("dip") in the market where a precipitous market move/change occurs. When applied to an electronic trading system, the state changes that may not reflect a true consensus may be problems limited to exchanges such as the CME that provide all customers access to a central order book that matches and trades orders per programmed rules. If an unacceptable message is detected, the disclosed embodiments may respond by taking an action, e.g., a corrective or responsive action, such as notifying the operator or administrator of the exchange, such as the Global Command Center ("GCC") of the Chicago Mercantile Exchange Inc. ("CME"), placing the market in a pre-open state, described in more detail below, establishing permanent or temporary trade price limitations, or other actions, or combinations thereof, to mitigate the effects of the extreme change, so as to, for example, slow down the market or otherwise allow traders time to adequately analyze and react to market conditions, and subsequently submit more messages/orders that can be used to better determine a true consensus.

By using dynamic circuit breakers, selective/enhanced checking and actions may be performed. The disclosed systems includes enhanced checks that allow for the ability to track price movements based upon participant type (e.g., price movement from market makers is handled differently then market takers), the ability to utilize reference prices during non-trading states during transition to open trading, the ability to use a time component (e.g., dynamic pre-open times based on participant type), the ability to use dynamic evaluation of the allowable price movement range (e.g., restrict/expand the price movement range based upon market activity), and the ability to use improved range checking after a circuit breaker event among other improvements. Dynamic circuit breakers and the enhanced checks allow the dynamic circuit breakers new functionality, such as the ability to short-circuit a market open (e.g., re-open the market immediately if the market reverts to prior price levels), accept or reject orders based upon a type or identity of market participant (e.g., market makers vs. market takers, participants that have set a new top of book three times in a row are rejected for a certain amount of time, etc.), the nature of the market participant's activity, and/or dynamically enable implieds to provide more liquidity in the market to prevent further price movements.

As described herein, a match engine module, such as one implemented by CME, may be centralized and coupled to multiple inputs from customers, and behave deterministically, e.g., programmed to depend on state, inputs, and outputs. The rapid speed of automated trading systems implementing such a centralized, deterministic match engine, where all customers or traders can access a central limit order book for a product, can quickly result in a product state that does not reflect a true consensus or desirable state of the product. Accordingly, the resulting problem is a problem arising in computer systems due to the high speeds of computer systems. The solutions disclosed are, in certain embodiments, implemented as automatic responses and actions by an exchange computing system computer.

The market monitored for movement, the basis for determination of a qualifying magnitude of movement, and/or the duration and actions taken during the requisite period of time over which a qualifying change may occur, may each/all be configurable, as will be described, and implementation dependent, so as to allow the exchange computing system to balance performance versus the ability to accurately respond only to movements in the market that are reflective of valid market operation. While the disclosed embodiments will be described with respect to a product by product or market by market implementation, e.g., implemented for each market/order book, it will be appreciated that the disclosed embodiments may be implemented so as to apply across markets for multiple products traded on one or more electronic trading systems, such as by monitoring an aggregate, correlated or other derivation of the relevant indicative parameters as described herein.

The disclosed embodiments may be implemented in association with a data transaction processing system that processes data items or objects, such as an exchange computing system. Customer or user devices (e.g., client computers) may submit electronic data transaction request messages, e.g., inbound messages, to the data transaction processing system over a data communication network. The electronic data transaction request messages may include, for example, transaction matching parameters, such as instructions and/or values, for processing the data transaction request messages within the data transaction processing system. The instructions may be to perform transactions, e.g., buy or sell a quantity of a product at a specified price. Products, e.g., financial instruments, or order books representing the state of an electronic marketplace for a product, may be represented as data objects within the exchange computing system. The instructions may also be conditional, e.g., buy or sell a quantity of a product at a given value if a trade for the product is executed at some other reference value.

The exchange computing system may include hardware matching processors that match, or attempt to match, the electronic data transaction request messages with other electronic data transaction request messages counter thereto. Incoming electronic data transaction request messages may be received from different client computers over a data communication network and output electronic data transaction result messages may be transmitted to the client computers and may be indicative of results of the attempts to match incoming electronic data transaction request messages.

The specifically configured matching processors may additionally generate information indicative of a state of an environment (e.g., the state of the order book) based on the processing of the electronic data transaction request messages, and report this information to data recipient computing systems via outbound messages published via private or public data feeds that contain electronic data transaction result messages. While the disclosed embodiments may be described with respect to electronic data transaction request and result messages, it will be appreciated that the disclosed embodiments may be implemented with respect to other technologies or messaging mechanisms later developed.

For example, one exemplary environment where the disclosed embodiments may be desirable is in financial markets, and in particular, electronic financial exchanges, such as the Chicago Mercantile Exchange Inc. (CME).

Exchange Computing System

An exchange provides one or more markets for the purchase and sale of various types of products including financial instruments such as stocks, bonds, futures contracts, options, currency, cash, swaps and other similar instruments. Agricultural products and commodities are also examples of products traded on such exchanges. A futures contract is a product that is a contract for the future delivery of a financial instrument such as a quantity of grains, metals, oils, bonds, currency, or cash settled against a rate. Generally, each exchange establishes a specification for each market provided thereby that defines at least the product traded in the market, minimum quantities that must be traded, and minimum changes in price (e.g., tick size). For some types of products (e.g., futures or options), the specification further defines a quantity of the underlying product represented by one unit (or lot) of the product, and delivery and expiration dates. For some types of products (e.g., variable commodities), the specification may further define variables, step sizes, premiums, or discounts for use in processing orders. As will be described, the exchange may further define the matching algorithm, or rules, by which incoming orders will be matched/allocated to resting orders.

Generally, a market may involve market makers, such as market participants who consistently provide bids and/or offers at specific prices in a manner typically conducive to balancing risk, and market takers who may be willing to execute transactions at prevailing bids or offers or may be characterized by more aggressive actions so as to maintain risk and/or exposure as a speculative investment strategy. From an alternate perspective, a market maker may be considered a market participant who places an order to sell at a price at which there is no previously or concurrently provided counter order. A market taker may be considered a market participant who places an order to buy at a price at which there is a previously or concurrently provided counter order. A balanced and efficient market may involve both market makers and market takers, coexisting in a mutually beneficial basis. The mutual existence, when functioning properly, may facilitate liquidity in the market such that a market may exist with "tight" bid-ask spreads (e.g., small difference between bid and ask prices) and may also feature high volumes of executed transactions indicating that large quantity orders may be executed without driving prices significantly higher or lower.

A financial instrument trading system, such as a futures exchange, such as the Chicago Mercantile Exchange Inc. (CME), provides a contract market where financial instruments, e.g., futures and options on futures, are traded using electronic systems. "Futures" is a term used to designate contracts for the purchase or sale of financial instruments or physical commodities for future delivery or cash settlement on a commodity futures exchange. A futures contract is a legally binding agreement to buy or sell a commodity at a specified price at a predetermined future time. An option contract is the right, but not the obligation, to sell or buy the underlying instrument (in this case, a futures contract) at a specified price on or before a certain expiration date. An option contract offers an opportunity to take advantage of futures price moves without actually having a futures position. The commodity to be delivered in fulfillment of the contract, or alternatively the commodity for which the cash market price shall determine the final settlement price of the futures contract, is known as the contract's underlying reference or "underlier." The underlying or underlier for an options contract is the corresponding futures contract that is purchased or sold upon the exercise of the option.

Typically, the terms and conditions of each futures contract are standardized as to the specification of the contract's underlying reference commodity, the composition of the commodity, quantity, delivery date, and means of contract settlement. In embodiments described herein, terms and conditions of each futures contract may be partially standardized as to the specification of the contract's underlying reference commodity and attributes thereof. The underlying reference commodity may include a range of possible qualities, quantities, delivery dates, and other attributes. For a spot market transaction, the underlying quality and attributes may be set, while a futures contract may provide predetermined offsets to allow for possible settlement of a non-conforming delivery. Cash settlement is a method of settling a futures contract whereby the parties effect final settlement when the contract expires by paying/receiving the loss/gain related to the contract in cash, rather than by effecting physical sale and purchase of the underlying reference commodity at a price determined by the futures contract, price. Options and futures may be based on more generalized market indicators, such as stock indices, interest rates, futures contracts, and other derivatives.

An exchange may provide for a centralized "clearing house" through which trades made must be confirmed, matched, and settled each day until offset or delivered. The clearing house may be an adjunct to an exchange, and may be an operating division of an exchange, which is responsible for settling trading accounts, clearing trades, collecting and maintaining performance bond funds, regulating delivery, and reporting trading data. One of the roles of the clearing house is to mitigate credit risk. Clearing is the procedure through which the clearing house becomes buyer to each seller of a futures contract, and seller to each buyer, also referred to as a novation, and reduces risk of financial loss due to breach of contract by assuring performance on each contract. A clearing member is a firm qualified to clear trades through the clearing house.

An exchange, which may include or be implemented as an exchange computing system, may operate under a central counterparty model, where the exchange acts as an intermediary between market participants for the transaction of financial instruments. In particular, the exchange computing system interposes itself into the transactions between the market participants, i.e., splits a given transaction between the parties into two separate transactions where the exchange computing system substitutes itself as the counterparty to each of the parties for that part of the transaction. In this way, the exchange computing system acts as a guarantor and central counterparty and there is no need for the market participants to disclose their identities to each other, or subject themselves to credit or other investigations by a potential counterparty. For example, the exchange computing system insulates one market participant from the default by another market participant. Market participants need only meet the requirements of the exchange computing system. Anonymity among the market participants encourages a more liquid market environment as there are lower barriers to participation. The exchange computing system can accordingly offer benefits such as centralized and anonymous matching and clearing.

A match engine, which may also be referred to herein as a module or match/matching engine processor, within an exchange trading system may comprise a transaction processing system that processes a high volume, e.g., millions, of messages or orders in one day. The messages are typically submitted from market participant computers. Exchange match engine systems may be subject to variable messaging loads due to variable market messaging activity. Performance of a match engine depends to a certain extent on the magnitude of the messaging load and the work needed to process that message at any given time. An exchange match engine may process large numbers of messages during times of high-volume messaging activity. With limited processing capacity, high messaging volumes may increase the response time or latency experienced by market participants.

Electronic messages such as incoming messages from market participants, i.e., "outright" messages, e.g., trade order messages, etc., are sent from client devices associated with market participants, or their representatives, to an electronic trading or market system.

Electronic Trading

Electronic trading of financial instruments, such as futures contracts, is conducted by market participants sending orders, such as to buy or sell one or more futures contracts, in electronic form to the exchange. These electronically submitted orders to buy and sell are then matched, if possible, by the exchange, i.e., by the exchange's matching engine, to execute a trade. Outstanding (unmatched, wholly unsatisfied/unfilled or partially satisfied/filled) orders are maintained in one or more data structures or databases referred to as "order books," such orders being referred to as "resting," and made visible, i.e., their availability for trading is advertised, to the market participants through electronic notifications/broadcasts, referred to as market data feeds. An order book is typically maintained for each product, e.g., instrument, traded on the electronic trading system and generally defines or otherwise represents the state of the market for that product, i.e., the current prices at which the market participants are willing to buy or sell various quantities of that product. As such, as used herein, an order book for a product may also be referred to as a market for that product.

Upon receipt of an incoming order to trade in a particular financial instrument, whether for a single-component financial instrument, e.g., a single futures contract, or for a multiple-component financial instrument, e.g., a combination contract such as a spread contract, a match engine, as described herein, will attempt to identify a previously received but unsatisfied order counter thereto, i.e., for the opposite transaction (buy or sell) in the same financial instrument at the same or better price (but not necessarily for the same quantity unless, for example, either order specifies a condition that it must be entirely filled or not at all).

Previously received but unsatisfied orders, i.e., orders which either did not match with a counter order when they were received or their quantity was only partially satisfied, referred to as a partial fill, are maintained by the electronic trading system in an order book database/data structure to await the subsequent arrival of matching orders or the occurrence of other conditions which may cause the order to be modified or otherwise removed from the order book.

If the match engine identifies one or more suitable previously received but unsatisfied counter orders, they, and the incoming order, are matched to execute a trade therebetween to at least partially satisfy the quantities of one or both of the incoming order or the identified orders. If there remains any residual unsatisfied quantity of the identified one or more orders, those orders are left on the order book with their remaining quantity to await a subsequent suitable counter order, i.e., to rest. If the match engine does not identify a suitable previously received but unsatisfied counter order, or the one or more identified suitable previously received but unsatisfied counter orders are for a lesser quantity than the incoming order, the incoming order is placed on the order book, referred to as "resting", with original or remaining unsatisfied quantity, to await a subsequently received suitable order counter thereto. The match engine then generates match event data reflecting the result of this matching process. Other components of the electronic trading system, as will be described, then generate the respective order acknowledgment and market data messages and transmit those messages to the market participants.

Matching, which is a function typically performed by the exchange, is a process, for a given order which specifies a desire to buy or sell a quantity of a particular instrument at a particular price, of seeking/identifying one or more wholly or partially, with respect to quantity, satisfying counter orders thereto, e.g., a sell counter to an order to buy, or vice versa, for the same instrument at the same, or sometimes better, price (but not necessarily the same quantity), which are then paired for execution to complete a trade between the respective market participants (via the exchange) and at least partially satisfy the desired quantity of one or both of the order and/or the counter order, with any residual unsatisfied quantity left to await another suitable counter order, referred to as "resting." A match event may occur, for example, when an aggressing order matches with a resting order. In one embodiment, two orders match because one order includes instructions for or specifies buying a quantity of an instrument at a price, and the other order includes instructions for or specifies selling a (different or same) quantity of the instrument at a same or better price. It should be appreciated that performing an instruction associated with a message may include attempting to perform the instruction. Whether or not an exchange computing system is able to successfully perform an instruction may depend on the state of the electronic marketplace.

While the disclosed embodiments will be described with respect to a product by product or market by market implementation, e.g., implemented for each market/order book, it will be appreciated that the disclosed embodiments may be implemented so as to apply across markets for multiple products traded on one or more electronic trading systems, such as by monitoring an aggregate, correlated or other derivation of the relevant indicative parameters as described herein.

While the disclosed embodiments may be discussed in relation to futures and/or options on futures trading, it should be appreciated that the disclosed embodiments may be applicable to any equity, fixed income security, currency, commodity, swap, options or futures trading system or market now available or later developed. It may be appreciated that a trading environment, such as a futures exchange as described herein, implements one or more economic markets where rights and obligations may be traded. As such, a trading environment may be characterized by a need to maintain market integrity, transparency, predictability, fair/equitable access, and participant expectations with respect thereto. In addition, it may be appreciated that electronic trading systems further impose additional expectations and demands by market participants as to transaction processing speed, latency, capacity, and response time, while creating additional complexities relating thereto. Accordingly, as will be described, the disclosed embodiments may further include functionality to ensure that the expectations of market participants are met, e.g., that transactional integrity and predictable system responses are maintained.

Financial instrument trading systems allow traders to submit orders and receive confirmations, market data, and other information electronically via electronic messages exchanged using a network. Electronic trading systems offer an efficient, fair and balanced market where market prices reflect a true consensus of the value of products traded among the market participants. Electronic marketplaces use electronic messages to communicate actions and related data of the electronic marketplace between market participants, clearing firms, clearing houses, and other parties. The messages can be received using an electronic trading system, wherein an action or transaction associated with the messages may be executed. For example, the message may contain information relating to an order to buy or sell a product in a particular electronic marketplace, and the action associated with the message may indicate that the order is to be placed in the electronic marketplace such that other orders which were previously placed may potentially be matched to the order of the received message. Thus, the electronic marketplace may conduct market activities through electronic systems.

As may be perceived/experienced by the market participants from outside the exchange or electronic trading system operated thereby, the following sequence describes how, at least in part, information may be propagated in such a system and how orders may be processed: (1) An opportunity is created at a matching engine of the exchange, such as by placing a recently received but unmatched order on the order book to rest; (2) The matching engine creates an update reflecting the opportunity and sends it to a feed engine; (3) The feed engine multicasts it to all of the market participants to advertise the opportunity to trade; (4) The market participants evaluate the opportunity and each, upon completion of their evaluation, may or may not choose to respond with an order responsive to the resting order, i.e., counter to the resting order; (5) The exchange gateway receives any counter orders generated by the market participants, sends confirmation of receipt back directly to each submitting market participant, and forwards the received orders to the matching engine; and (6) The matching engine evaluates the received orders and matches the first arriving order against the resting opportunity and a trade is executed.

Electronic Data Transaction Request/Result Messages and Market Data Feeds

As used herein, a financial message, or an electronic message, refers both to messages communicated by market participants to an electronic trading or market system and vice versa. The messages may be communicated using packets or other techniques operable to communicate information between systems and system components. Some messages may be associated with actions to be taken in the electronic trading or market system. In one embodiment, upon receipt of a request, a token is allocated and included in a TCP shallow acknowledgment transmission sent back to the participant acknowledging receipt of the request. It should be appreciated that while this shallow acknowledgment is, in some sense, a response to the request, it does not confirm the processing of an order included in the request. The participant, i.e., their device, then sends back a TCP acknowledgment which acknowledges receipt of the shallow acknowledgment and token.

Financial messages communicated to the electronic trading system, also referred to as "inbound" messages, may include associated actions that characterize the messages, such as trader orders, order modifications, order cancellations and the like, as well as other message types. Inbound messages may be sent from client devices associated with market participants, or their representatives, e.g., trade order messages, etc., to an electronic trading or market system. For example, a market participant may submit an electronic message to the electronic trading system that includes an associated specific action to be undertaken by the electronic trading system, such as entering a new trade order into the market or modifying an existing order in the market. In one embodiment, if a participant wishes to modify a previously sent request, e.g., a prior order which has not yet been processed or traded, they may send a request message comprising a request to modify the prior request. In one exemplary embodiment, the incoming request itself, e.g., the inbound order entry, may be referred to as an iLink message. iLink is a bidirectional communications/message protocol/message format implemented by the Chicago Mercantile Exchange Inc.

Financial messages communicated from the electronic trading system, referred to as "outbound" messages, may include messages responsive to inbound messages, such as confirmation messages, or other messages such as market update messages, quote messages, and the like. Outbound messages, or electronic data transaction result messages, may be disseminated via data feeds.

Financial messages may further be categorized as having or reflecting an impact on a market or electronic marketplace, also referred to as an "order book" or "book," for a traded product, such as a prevailing price therefore, number of resting orders at various price levels and quantities thereof, etc., or not having or reflecting an impact on a market or a subset or portion thereof. In one embodiment, an electronic order book may be understood to be an electronic collection of the outstanding or resting orders for a financial instrument.

For example, a request to place a trade may result in a response indicative of the trade either being matched with, or being rested on an order book to await, a suitable counter-order. This response may include a message directed solely to the trader who submitted the order to acknowledge receipt of the order and report whether it was matched, and the extent thereto, or rested. The response may further include a message to all market participants reporting a change in the order book due to the order, or an electronic data transaction result message. This response may take the form of a report of the specific change to the order book, e.g., an order for quantity X at price Y was added to the book (referred to, in one embodiment, as a Market By Order message), or may simply report the result, e.g., price level Y now has orders for a total quantity of Z (where Z is the sum of the previous resting quantity plus quantity X of the new order). In some cases, requests may elicit a non-impacting response, such as temporally proximate to the receipt of the request, and then cause a separate market-impact reflecting response at a later time. For example, a stop order, fill or kill order (FOK), also known as an immediate or cancel order, or other conditional request may not have an immediate market impacting effect, if at all, until the requisite conditions are met.

An acknowledgement or confirmation of receipt, e.g., a non-market impacting communication, may be sent to the trader simply confirming that the order was received. Upon the conditions being met and a market impacting result thereof occurring, a market-impacting message may be transmitted as described herein both directly back to the submitting market participant and to all market participants (in a Market by Price "MBP", or Market by Order "MBO"). It should be appreciated that additional conditions may be specified, such as a time or price limit, which may cause the order to be dropped or otherwise canceled and that such an event may result in another non-market-impacting communication instead. In some implementations, market impacting communications may be communicated separately from non-market impacting communications, such as via a separate communications channel or feed.

For additional details and descriptions of different market data feeds, see U.S. Patent Publication No. 2017/0331774, filed on May 16, 2016, entitled "Systems and Methods for Consolidating Multiple Feed Data", assigned to the assignee of the present application, the entirety of which is incorporated by reference herein and relied upon.

It should be further appreciated that various types of market data feeds may be provided which reflect different markets or aspects thereof. Market participants may then, for example, subscribe to receive those feeds of interest to them. For example, data recipient computing systems may choose to receive one or more different feeds. As market impacting communications usually tend to be more important to market participants than non-impacting communications, this separation may reduce congestion and/or noise among those communications having or reflecting an impact on a market or portion thereof. Furthermore, a particular market data feed may only communicate information related to the top buy/sell prices for a particular product, referred to as "top of book" feed, e.g., only changes to the top 10 price levels are communicated. Such limitations may be implemented to reduce consumption of bandwidth and message generation resources. In this case, while a request message may be considered market-impacting if it affects a price level other than the top buy/sell prices, it will not result in a message being sent to the market participants.

Examples of the various types of market data feeds which may be provided by electronic trading systems, such as the CME, in order to provide different types or subsets of market information or to provide such information in different formats include Market By Order, Market Depth (also known as Market by Price to a designated depth of the book), e.g., CME offers a 10-deep market by price feed, Top of Book (a single depth Market by Price feed), and combinations thereof. There may also be all manner of specialized feeds in terms of the content, i.e., providing, for example, derived data, such as a calculated index. Market data feeds may be characterized as providing a "view" or "overview" of a given market, an aggregation or a portion thereof or changes thereto. For example, a market data feed, such as a Market by Price ("MBP") feed, may convey, with each message, the entire/current state of a market, or portion thereof, for a particular product as a result of one or more market impacting events. For example, an MBP message may convey a total quantity of resting buy/sell orders at a particular price level in response to a new order being placed at that price. An MBP message may convey a quantity of an instrument which was traded in response to an incoming order being matched with one or more resting orders. MBP messages may only be generated for events affecting a portion of a market, e.g., only the top 10 resting buy/sell orders and, thereby, only provide a view of that portion. As used herein, a market impacting request may be said to impact the "view" of the market as presented via the market data feed.

An MBP feed may utilize different message formats for conveying different types of market impacting events. For example, when a new order is rested on the order book, an MBP message may reflect the current state of the price level to which the order was added, e.g., the new aggregate quantity and the new aggregate number of resting orders. As can be seen, such a message conveys no information about the individual resting orders, including the newly rested order, themselves to the market participants. Only the submitting market participant, who receives a separate private message acknowledging the event, knows that it was their order that was added to the book. Similarly, when a trade occurs, an MBP message may be sent which conveys the price at which the instrument was traded, the quantity traded and the number of participating orders, but may convey no information as to whose particular orders contributed to the trade. MBP feeds may further batch reporting of multiple events, i.e., report the result of multiple market impacting events in a single message.

Alternatively, a market data feed, referred to as a Market By Order ("MBO") feed, may convey data reflecting a change that occurred to the order book rather than the result of that change, e.g., that order ABC for quantity X was added to price level Y or that order ABC and order XYZ traded a quantity X at a price Y. In this case, the MBO message identifies only the change that occurred so a market participant wishing to know the current state of the order book must maintain their own copy and apply the change reflected in the message to know the current state. As can be seen, MBO messages may carry much more data than MBP messages because MBO messages reflect information about each order, whereas MBP messages contain information about orders affecting some predetermined value levels. Furthermore, because specific orders, but not the submitting traders thereof, are identified, other market participants may be able to follow that order as it progresses through the market, e.g., as it is modified, canceled, traded, etc.

An MBP book data object may include information about multiple values. The MBP book data object may be arranged and structured so that information about each value is aggregated together. Thus, for a given value V (e.g., a price), the MBP book data object may aggregate all the information by value, such as for example, the number of orders having a certain position at value V, the quantity of total orders resting at value V, etc. Thus, the value field may be the key, or may be a unique field, within an MBP book data object. In one embodiment, the value for each entry within the MBP book data object is different. In one embodiment, information in an MBP book data object is presented in a manner such that the value field is the most granular field of information.

An MBO book data object may include information about multiple orders. The MBO book data object may be arranged and structured so that information about each order is represented. Thus, for a given order O, the MBO book data object may provide all of the information for order O. Thus, the order field may be the key, or may be a unique field, within an MBO book data object. In one embodiment, the order identifier (order ID) for each entry within the MBO book data object is different. In one embodiment, information in an MBO book data object is presented in a manner such that the order field is the most granular field of information.

Thus, the MBO book data object may include data about unique orders, e.g., all unique resting orders for a product, and the MBP book data object may include data about unique values, e.g., up to a predetermined level, e.g., top ten price or value levels, for a product.

It should be appreciated that the number, type and manner of market data feeds provided by an electronic trading system are implementation dependent and may vary depending upon the types of products traded by the electronic trading system, customer/trader preferences, bandwidth and data processing limitations, etc. and that all such feeds, now available or later developed, are contemplated herein. MBP and MBO feeds may refer to categories/variations of market data feeds, distinguished by whether they provide an indication of the current state of a market resulting from a market impacting event (MBP) or an indication of the change in the current state of a market due to a market impacting event (MBO).

Messages, whether MBO or MBP, generated responsive to market impacting events which are caused by a single order, such as a new order, an order cancellation, an order modification, etc., are simple and compact and easily created and transmitted. However, messages, whether MBO or MBP, generated responsive to market impacting events which are caused by more than one order, such as a trade, may require the transmission of a significant amount of data to convey the requisite information to the market participants. For trades involving a large number of orders, e.g., a buy order for a quantity of 5000 which matches 5000 sell orders each for a quantity of 1, a significant amount of information may need to be sent, e.g., data indicative of each of the 5000 trades that have participated in the market impacting event.

In one embodiment, an exchange computing system may generate multiple order book objects, one for each type of view that is published or provided. For example, the system may generate an MBO book object and an MBP book object. It should be appreciated that each book object, or view for a product or market, may be derived from the MBO book object, which includes all the orders for a given financial product or market.

An inbound message may include an order that affects the MBO book object, the MBP book object, or both. An outbound message may include data from one or more of the structures within the exchange computing system, e.g., the MBO book object queues or the MBP book object queues.

Furthermore, each participating trader needs to receive a notification that their order has traded. Continuing with the example, this may require sending 5001 individual trade notification messages, or even 10,000+ messages where each contributing side (buy vs. sell) is separately reported, in addition to the notification sent to all the market participants.

As detailed in U.S. Patent Publication No. 2015/0161727, the entirety of which is incorporated by reference herein and relied upon, it may be recognized that trade notifications sent to all market participants may include redundant information repeated for each participating trade and a structure of an MBP trade notification message may be provided which results in a more efficient communication of the occurrence of a trade. The message structure may include a header portion which indicates the type of transaction which occurred, i.e., a trade, as well as other general information about the event, an instrument portion which comprises data about each instrument which was traded as part of the transaction, and an order portion which comprises data about each participating order. In one embodiment, the header portion may include a message type, Transaction Time, Match Event Indicator, and Number of Market Data Entries ("No. MD Entries") fields. The instrument portion may include a market data update action indicator ("MD Update Action"), an indication of the Market Data Entry Type ("MD Entry Type"), an identifier of the instrument/security involved in the transaction ("Security ID"), a report sequence indicator ("Rpt Seq"), the price at which the instrument was traded ("MD Entry PX"), the aggregate quantity traded at the indicated price ("ConsTradeQty"), the number of participating orders ("NumberOfOrders"), and an identifier of the aggressor side ("Aggressor Side") fields. The order portion may further include an identifier of the participating order ("Order ID"), described in more detail below, and the quantity of the order traded ("MD Entry Size") fields. It should be appreciated that the particular fields included in each portion are implementation dependent and that different fields in addition to, or in lieu of, those listed may be included depending upon the implementation. It should be appreciated that the exemplary fields can be compliant with the FIX binary and/or FIX/FAST protocol for the communication of the financial information.

The instrument portion contains a set of fields, e.g., seven fields accounting for 23 bytes, which are repeated for each participating instrument. In complex trades, such as trades involving combination orders or strategies, e.g., spreads, or implied trades, there may be multiple instruments being exchanged among the parties. In one embodiment, the order portion includes only one field, accounting for 4 bytes, for each participating order which indicates the quantity of that order which was traded. As will be discussed below, the order portion may further include an identifier of each order, accounting for an additional 8 bytes, in addition to the quantity thereof traded. As should be appreciated, data which would have been repeated for each participating order, is consolidated or otherwise summarized in the header and instrument portions of the message thereby eliminating redundant information and, overall, significantly reducing the size of the message.

The disclosed embodiments may be applicable to the use of either an MBP market data feed and/or an MBO market data feed.

Matching and Transaction Processing

Market participants, e.g., traders, use software to send orders or messages to the trading platform. The order identifies the product, the quantity of the product the trader wishes to trade, a price at which the trader wishes to trade the product, and a direction of the order (i.e., whether the order is a bid, i.e., an offer to buy, or an ask, i.e., an offer to sell). It will be appreciated that there may be other order types or messages that traders can send including requests to modify or cancel a previously submitted order.

As was described above, the exchange computer system monitors incoming orders received thereby and attempts to identify, i.e., match or allocate, as described herein, one or more previously received, but not yet matched, orders, i.e., limit orders to buy or sell a given quantity at a given price, referred to as "resting" orders, stored in an order book database, wherein each identified order is contra to the incoming order and has a favorable price relative to the incoming order. An incoming order may be an "aggressor" order, i.e., a market order to sell a given quantity at whatever may be the current resting bid order price(s) or a market order to buy a given quantity at whatever may be the current resting ask order price(s). An incoming order may be a "market making" order, i.e., a market order to buy or sell at a price for which there are currently no resting orders. In particular, if the incoming order is a bid, i.e., an offer to buy, then the identified order(s) will be an ask, i.e., an offer to sell, at a price that is identical to or higher than the bid price. Similarly, if the incoming order is an ask, i.e., an offer to sell, the identified order(s) will be a bid, i.e., an offer to buy, at a price that is identical to or lower than the offer price.

An exchange computing system may receive conditional orders or messages for a data object, where the order may include two prices or values: a reference value and a stop value. A conditional order may be configured so that when a product represented by the data object trades at the reference price, the stop order is activated at the stop value. For example, if the exchange computing system's order management module (described below) includes a stop order with a stop price of 5 and a limit price of 1 for a product, and a trade at 5 (i.e., the stop price of the stop order) occurs, then the exchange computing system attempts to trade at 1 (i.e., the limit price of the stop order). In other words, a stop order is a conditional order to trade (or execute) at the limit price that is triggered (or elected) when a trade at the stop price occurs.

Stop orders also rest on, or are maintained in, an order book to monitor for a trade at the stop price, which triggers an attempted trade at the limit price. In some embodiments, a triggered limit price for a stop order may be treated as an incoming order.

Upon identification (matching) of a contra order(s), a minimum of the quantities associated with the identified order and the incoming order is matched and that quantity of each of the identified and incoming orders become two halves of a matched trade that is sent to a clearing house. The exchange computer system considers each identified order in this manner until either all the identified orders have been considered or all the quantity associated with the incoming order has been matched, i.e., the order has been filled. If any quantity of the incoming order remains, an entry may be created in the order book database and information regarding the incoming order is recorded therein, i.e., a resting order is placed on the order book for the remaining quantity to await a subsequent incoming order counter thereto.

It should be appreciated that in electronic trading systems implemented via an exchange computing system, a trade price (or match value) may differ from (i.e., be better for the submitter, e.g., lower than a submitted buy price or higher than a submitted sell price) the limit price that is submitted, e.g., a price included in an incoming message, or a triggered limit price from a stop order.

As used herein, "better" than a reference value means lower than the reference value if the transaction is a purchase (or acquire) transaction, and higher than the reference value if the transaction is a sell transaction. Said another way, for purchase (or acquire) transactions, lower values are better, and for sell (or relinquish) transactions, higher values are better.

Traders access the markets on a trading platform using trading software that receives and displays at least a portion of the order book for a market, i.e., at least a portion of the currently resting orders, enables a trader to provide parameters for an order for the product traded in the market, and transmits the order to the exchange computer system. The trading software typically includes a graphical user interface to display at least a price and quantity of some of the entries in the order book associated with the market. The number of entries of the order book displayed is generally preconfigured by the trading software, limited by the exchange computer system, or customized by the user. Some graphical user interfaces display order books of multiple markets of one or more trading platforms. The trader may be an individual who trades on his/her behalf, a broker trading on behalf of another person or entity, a group, or an entity. Furthermore, the trader may be a system that automatically generates and submits orders.

If the exchange computer system identifies that an incoming market order may be filled by a combination of multiple resting orders, e.g., the resting order at the best price only partially fills the incoming order, the exchange computer system may allocate the remaining quantity of the incoming order, i.e., that which was not filled by the resting order at the best price, among such identified orders in accordance with prioritization and allocation rules/algorithms, referred to as "allocation algorithms" or "matching algorithms," as, for example, may be defined in the specification of the particular financial product or defined by the exchange for multiple financial products. Similarly, if the exchange computer system identifies multiple orders contra to the incoming limit order and that have an identical price which is favorable to the price of the incoming order, i.e., the price is equal to or better, e.g., lower if the incoming order is a buy (or instruction to purchase, or instruction to acquire) or higher if the incoming order is a sell (or instruction to relinquish), than the price of the incoming order, the exchange computer system may allocate the quantity of the incoming order among such identified orders in accordance with the matching algorithms as, for example, may be defined in the specification of the particular financial product or defined by the exchange for multiple financial products.

An exchange responds to inputs, such as trader orders, cancellation, etc., in a manner as expected by the market participants, such as based on market data, e.g., prices, available counter-orders, etc., to provide an expected level of certainty that transactions will occur in a consistent and predictable manner and without unknown or unascertainable risks. Accordingly, the method by which incoming orders are matched with resting orders must be defined so that market participants have an expectation of what the result will be when they place an order or have resting orders and an incoming order is received, even if the expected result is, in fact, at least partially unpredictable due to some component of the process being random or arbitrary or due to market participants having imperfect or less than all information, e.g., unknown position of an order in an order book. Typically, the exchange defines the matching/allocation algorithm that will be used for a particular financial product, with or without input from the market participants. Once defined for a particular product, the matching/allocation algorithm is typically not altered, except in limited circumstance, such as to correct errors or improve operation, so as not to disrupt trader expectations. It will be appreciated that different products offered by a particular exchange may use different matching algorithms.

For example, a first-in/first-out (FIFO) matching algorithm, also referred to as a "Price Time" algorithm, considers each identified order sequentially in accordance with when the identified order was received. The quantity of the incoming order is matched to the quantity of the identified order at the best price received earliest, then quantities of the next earliest best price orders, and so on until the quantity of the incoming order is exhausted. Some product specifications define the use of a pro-rata matching algorithm, wherein a quantity of an incoming order is allocated to each of plurality of identified orders proportionally. Some exchange computer systems provide a priority to certain standing orders in particular markets. An example of such an order is the first order that improves a price (i.e., improves the market) for the product during a trading session. To be given priority, the trading platform may require that the quantity associated with the order is at least a minimum quantity. Further, some exchange computer systems cap the quantity of an incoming order that is allocated to a standing order on the basis of a priority for certain markets. In addition, some exchange computer systems may give a preference to orders submitted by a trader who is designated as a market maker for the product. Other exchange computer systems may use other criteria to determine whether orders submitted by a particular trader are given a preference. Typically, when the exchange computer system allocates a quantity of an incoming order to a plurality of identified orders at the same price, the trading host allocates a quantity of the incoming order to any orders that have been given priority. The exchange computer system thereafter allocates any remaining quantity of the incoming order to orders submitted by traders designated to have a preference, and then allocates any still remaining quantity of the incoming order using the FIFO or pro-rata algorithms. Pro-rata algorithms used in some markets may require that an allocation provided to a particular order in accordance with the pro-rata algorithm must meet at least a minimum allocation quantity. Any orders that do not meet or exceed the minimum allocation quantity are allocated to on a FIFO basis after the pro-rata allocation (if any quantity of the incoming order remains). More information regarding order allocation may be found in U.S. Pat. No. 7,853,499, the entirety of which is incorporated by reference herein and relied upon.

Other examples of matching algorithms which may be defined for allocation of orders of a particular financial product include: Price Explicit Time; Order Level Pro Rata; Order Level Priority Pro Rata; Preference Price Explicit Time; Preference Order Level Pro Rata; Preference Order Level Priority Pro Rata; Threshold Pro-Rata; Priority Threshold Pro-Rata; Preference Threshold Pro-Rata; Priority Preference Threshold Pro-Rata; and Split Price-Time Pro-Rata, which are described in U.S. patent application Ser. No. 13/534,499, filed on Jun. 27, 2012, entitled "Multiple Trade Matching Algorithms," published as U.S. Patent Application Publication No. 2014/0006243 A1, the entirety of which is incorporated by reference herein and relied upon.

With respect to resting orders, allocation/matching suitable resting orders to match against an incoming order can be performed, as described herein, in many different ways. Generally, it will be appreciated that allocation/matching algorithms are only needed when the incoming order quantity is less than the total quantity of the suitable resting orders as, only in this situation, is it necessary to decide which resting order(s) will not be fully satisfied, which trader(s) will not get their orders filled. It can be seen from the above descriptions of the matching/allocation algorithms, that they fall generally into three categories: time priority/first-in-first-out ("FIFO"), pro rata, or a hybrid of FIFO and pro rata.

FIFO generally rewards the first trader to place an order at a particular price and maintains this reward indefinitely. So, if a trader is the first to place an order at price X, no matter how long that order rests and no matter how many orders may follow at the same price, as soon as a suitable incoming order is received, that first trader will be matched first. This "first mover" system may commit other traders to positions in the queue after the first move traders. Furthermore, while it may be beneficial to give priority to a trader who is first to place an order at a given price because that trader is, in effect, taking a risk, the longer that the trader's order rests, the less beneficial it may be. For instance, it could deter other traders from adding liquidity to the marketplace at that price because they know the first mover (and potentially others) already occupies the front of the queue.

With a pro rata allocation, incoming orders are effectively split among suitable resting orders. This provides a sense of fairness in that everyone may get some of their order filled. However, a trader who took a risk by being first to place an order (a "market turning" order) at a price may end up having to share an incoming order with a much later submitted order. Furthermore, as a pro rata allocation distributes the incoming order according to a proportion based on the resting order quantities, traders may place orders for large quantities, which they are willing to trade but may not necessarily want to trade, in order to increase the proportion of an incoming order that they will receive. This results in an escalation of quantities on the order book and exposes a trader to a risk that someone may trade against one of these orders and subject the trader to a larger trade than they intended. In the typical case, once an incoming order is allocated against these large resting orders, the traders subsequently cancel the remaining resting quantity which may frustrate other traders. Accordingly, as FIFO and pro rata both have benefits and problems, exchanges may try to use hybrid allocation/matching algorithms which attempt to balance these benefits and problems by combining FIFO and pro rata in some manner. However, hybrid systems define conditions or fixed rules to determine when FIFO should be used and when pro rata should be used. For example, a fixed percentage of an incoming order may be allocated using a FIFO mechanism with the remainder being allocated pro rata.

Clearing House

The clearing house of an exchange clears, settles and guarantees matched transactions in contracts occurring through the facilities of the exchange. In addition, the clearing house establishes and monitors financial requirements for clearing members and conveys certain clearing privileges in conjunction with the relevant exchange markets. The clearing house also manages the delivery process.

The clearing house establishes clearing level performance bonds (margins) for all products of the exchange and establishes minimum performance bond requirements for customers of such products. A performance bond, also referred to as a margin requirement, corresponds with the funds that must be deposited by a customer with his or her broker, by a broker with a clearing member or by a clearing member with the clearing house, for the purpose of insuring the broker or clearing house against loss on open futures or options contracts. This is not a part payment on a purchase. The performance bond helps to ensure the financial integrity of brokers, clearing members and the exchange as a whole. The performance bond refers to the minimum dollar deposit required by the clearing house from clearing members in accordance with their positions. Maintenance, or maintenance margin, refers to a sum, usually smaller than the initial performance bond, which must remain on deposit in the customer's account for any position at all times. The initial margin is the total amount of margin per contract required by the broker when a futures position is opened. A drop in funds below this level requires a deposit back to the initial margin levels, i.e., a performance bond call. If a customer's equity in any futures position drops to or under the maintenance level because of adverse price action, the broker must issue a performance bond/margin call to restore the customer's equity. A performance bond call, also referred to as a margin call, is a demand for additional funds to bring the customer's account back up to the initial performance bond level whenever adverse price movements cause the account to go below the maintenance.

The exchange derives its financial stability in large part by removing debt obligations among market participants relatively quickly. This is accomplished by determining a settlement price at the close of the market each day for each contract and marking all open positions to that price, referred to as "mark to market." Every contract is debited or credited based on that trading session's gains or losses. As prices move for or against a position, funds flow into and out of the trading account. In the case of the CME, each business day by 6:40 a.m. Chicago time, based on the mark-to-the-market of all open positions to the previous trading day's settlement price, the clearing house pays to or collects cash from each clearing member. This cash flow, known as settlement variation, is performed by CME's settlement banks based on instructions issued by the clearing house. All payments to and collections from clearing members are made in "same-day" funds. In addition to the 6:40 a.m. settlement, a daily intra-day mark-to-the market of all open positions, including trades executed during the overnight GLOBEX®, the CME's electronic trading systems, trading session and the current day's trades matched before 11:15 a.m., is performed using current prices. The resulting cash payments are made intra-day for same day value. In times of extreme price volatility, the clearing house has the authority to perform additional intra-day mark-to-the-market calculations on open positions and to call for immediate payment of settlement variation. CME's mark-to-the-market settlement system may differ from the settlement systems implemented by many other financial markets, including the interbank, Treasury securities, over-the-counter foreign exchange and debt, options, and equities markets, where participants regularly assume credit exposure to each other. In those markets, the failure of one participant can have a ripple effect on the solvency of the other participants. Conversely, CME's mark-to-the-market system may not allow losses to accumulate over time or allow a market participant the opportunity to defer losses associated with market positions.

While the disclosed embodiments may be described in reference to the CME, it should be appreciated that these embodiments are applicable to any exchange. Such other exchanges may include a clearing house that, like the CME clearing house, clears, settles, and guarantees all matched transactions in contracts of the exchange occurring through its facilities. In addition, such clearing houses establish and monitor financial requirements for clearing members and convey certain clearing privileges in conjunction with the relevant exchange markets.

The disclosed embodiments are also not limited to uses by a clearing house or exchange for purposes of enforcing a performance bond or margin requirement. For example, a market participant may use the disclosed embodiments in a simulation or other analysis of a portfolio. In such cases, the settlement price may be useful as an indication of a value at risk and/or cash flow obligation rather than a performance bond. The disclosed embodiments may also be used by market participants or other entities to forecast or predict the effects of a prospective position on the margin requirement of the market participant.

Clearing houses, like the CME clearing house may specify the conditions of delivery for the contracts they cover. The exchange designates warehouse and/or delivery locations for many commodities. When delivery takes place, a warrant or bearer receipt that represents a certain quantity and quality of a commodity in a specific location changes hands from the seller to the buyer who then makes full payment. The buyer has the right to remove the commodity from the warehouse or delivery location or has the option of leaving the commodity at the storage facility for a periodic fee. The buyer could also arrange with the warehouse or delivery location to transport the commodity to another location of his or her choice, including his or her home, and pays any transportation fees. In addition to delivery specifications stipulated by the exchanges, the quality, grade, or nature of the underlying asset to be delivered are also regulated by the exchanges.

The delivery process may involve several deadlines that are handled by the exchange clearing house. Different commodities may include different parameters and timing for delivery. The first deadline of an example delivery process is called position day. This is the day that the short position holder in the market indicates to the exchange clearing house that the holder intends to make delivery on his futures position and registers a shipping certificate in the clearing delivery system. Also, starting on the first position day, each participant reports all of its open long positions to the clearing house. The clearing house ranks the long positions according to the amount of time they have been open and assigns the oldest long position to the short position holder that has given his intention to deliver.

At a second deadline, referred to as notice day, the short position holder and long position holder receive notification that they have been matched, and the long position holder receives an invoice from the clearing house. A third deadline is the actual delivery day. The long position holder makes payment to the clearing house, and the clearing house simultaneously transfers the payment from the long to the short position holder, and the shipping certificate is transferred from the short to the long position holder. Now the long position holder is the owner of the shipping certificate and the participant has several options. In an example of grain, the participant can hold the certificate indefinitely, but must pay the warehouse that issued the certificate storage charges, that are collected and distributed monthly by the clearing house. The participant can cancel the shipping certificate and order the issuing warehouse to load-out the physical commodity into a conveyance that he places at the issuing warehouse. The participant can transfer or sell the certificate to someone else. Or the participant can go back into the futures market and open a new position by selling futures, in which case he now becomes the short position holder. The participant may then initiate a new three-day delivery process, that would entail re-delivery of the warehouse certificate the participant now owns. During this time, the participant will continue to pay storage charges to the warehouse until he re-delivers the certificate.

Spread Instruments

Traders trading on an exchange including, for example, exchange computer system 100, often desire to trade multiple financial instruments in combination. Each component of the combination may be called a leg. Traders can submit orders for individual legs or in some cases can submit a single order for multiple financial instruments in an exchange-defined combination. Such orders may be called a strategy order, a spread order, or a variety of other names.

A spread instrument may involve the simultaneous purchase of one financial instrument and sale of a related financial instrument, called legs, as a unit. The legs of a spread instrument may be options or futures contracts, or combinations of the two. Trades in spread instruments are executed to yield an overall net position whose value, called the spread, depends on the difference between the prices of the legs. Spread instruments may be traded in an attempt to profit from the widening or narrowing of the spread, rather than from movement in the prices of the legs directly. Spread instruments are either "bought" or "sold" depending on whether the trade will profit from the widening or narrowing of the spread, respectively. An exchange often supports trading of common spreads as a unit rather than as individual legs, thus ensuring simultaneous execution of the two legs, eliminating the execution risk of one leg executing but the other failing.

One example of a spread instrument is a calendar spread instrument. The legs of a calendar spread instrument differ in delivery date of the underlier. The leg with the earlier occurring delivery date is often referred to as the lead month contract. A leg with a later occurring delivery date is often referred to as a deferred month contract. Another example of a spread instrument is a butterfly spread instrument, which includes three legs having different delivery dates. The delivery dates of the legs may be equidistant to each other. The counterparty orders that are matched against such a combination order may be individual, "outright" orders or may be part of other combination orders.

In other words, an exchange may receive, and hold or let rest on the books, outright orders for individual contracts as well as outright orders for spreads associated with the individual contracts. An outright order (for either a contract or for a spread) may include an outright bid or an outright offer, although some outright orders may bundle many bids or offers into one message (often called a mass quote).

A spread is an order for the price difference between two contracts. This results in the trader holding a long and a short position in two or more related futures or options on futures contracts, with the objective of profiting from a change in the price relationship. A typical spread product includes multiple legs, each of which may include one or more underlying financial instruments. A butterfly spread product, for example, may include three legs. The first leg may consist of buying a first contract. The second leg may consist of selling two of a second contract. The third leg may consist of buying a third contract. The price of a butterfly spread product may be calculated as:

$$\text{Butterfly} = \text{Leg1} - 2*\text{Leg2} + \text{Leg3}$$

In the above equation, Leg1 equals the price of the first contract, Leg2 equals the price of the second contract and Leg3 equals the price of the third contract. Thus, a butterfly spread could be assembled from two inter-delivery spreads in opposite directions with the center delivery month common to both spreads.

A calendar spread, also called an intra-commodity spread, for futures is an order for the simultaneous purchase and sale of the same futures contract in different contract months (i.e., buying a September CME S&P 500® futures contract and selling a December CME S&P 500 futures contract).

A crush spread is an order, usually in the soybean futures market, for the simultaneous purchase of soybean futures and the sale of soybean meal and soybean oil futures to establish a processing margin. A crack spread is an order for a specific spread trade involving simultaneously buying and selling contracts in crude oil and one or more derivative products, typically gasoline and heating oil. Oil refineries may trade a crack spread to hedge the price risk of their operations, while speculators attempt to profit from a change in the oil/gasoline price differential.

A straddle is an order for the purchase or sale of an equal number of puts and calls, with the same strike price and expiration dates. A long straddle is a straddle in which a long position is taken in both a put and a call option. A short straddle is a straddle in which a short position is taken in both a put and a call option. A strangle is an order for the purchase of a put and a call, in which the options have the same expiration and the put strike is lower than the call strike, called a long strangle. A strangle may also be the sale of a put and a call, in which the options have the same expiration and the put strike is lower than the call strike, called a short strangle. A pack is an order for the simultaneous purchase or sale of an equally weighted, consecutive series of four futures contracts, quoted on an average net change basis from the previous day's settlement price. Packs provide a readily available, widely accepted method for executing multiple futures contracts with a single transaction. A bundle is an order for the simultaneous sale or purchase of one each of a series of consecutive futures contracts. Bundles provide a readily available, widely accepted method for executing multiple futures contracts with a single transaction.

Implication

An exchange may match outright orders, such as individual contracts or spread orders (which as discussed herein could include multiple individual contracts). The exchange may also imply orders from outright orders. For example, exchange computer system 100 may derive, identify and/or advertise, publish, display, or otherwise make available for trading orders based on outright orders.

As was described above, the financial instruments which are the subject of the orders to trade, may include one or more component financial instruments. While each financial instrument may have its own order book, i.e., market, in which it may be traded, in the case of a financial instrument having more than one component financial instrument, those component financial instruments may further have their own order books in which they may be traded. Accordingly, when an order for a financial instrument is received, it may be matched against a suitable counter order in its own order book or, possibly, against a combination of suitable counter orders in the order books the component financial instruments thereof, or which share a common component financial instrument. For example, an order for a spread contract comprising component financial instruments A and B may be matched against another suitable order for that spread contract. However, it may also be matched against suitable separate counter orders for the A and for the B component financial instruments found in the order books, therefore. Similarly, if an order for the A contract is received and a suitable match cannot be found in the A order book, it may be possible to match the order for A against a combination of a suitable counter order for a spread contract comprising the A and B component financial instruments and a suitable counter order for the B component financial instrument. This is referred to as "implication" where a given order for a financial instrument may be matched via a combination of suitable counter orders for financial instruments which share common, or otherwise interdependent, component financial instruments. Implication increases the liquidity of the market by providing additional opportunities for orders to be traded. Increasing the number of transactions may further increase the number of transaction fees collected by the electronic trading system.

The order for a particular financial instrument actually received from a market participant, whether it comprises one or more component financial instruments, is referred to as a "real" or "outright" order, or simply as an outright. The one or more orders which must be synthesized and submitted into order books other than the order book for the outright order to create matches therein, are referred to as "implied" orders.

Upon receipt of an incoming order, the identification or derivation of suitable implied orders which would allow at least a partial trade of the incoming outright order to be executed is referred to as "implication" or "implied matching", the identified orders being referred to as an "implied match." Depending on the number of component financial instruments involved, and whether those component financial instruments further comprise component financial instruments of their own, there may be numerous different implied matches identified which would allow the incoming order to be at least partially matched and mechanisms may be provided to arbitrate, e.g., automatically, among them, such as by picking the implied match comprising the least number of component financial instruments or the least number of synthesized orders.

Upon receipt of an incoming order, or thereafter, a combination of one or more suitable/hypothetical counter orders which have not actually been received but if they were received, would allow at least a partial trade of the incoming order to be executed, may be, e.g., automatically, identified or derived and referred to as an "implied opportunity." As with implied matches, there may be numerous implied opportunities identified for a given incoming order. Implied opportunities are advertised to the market participants, such as via suitable synthetic orders, e.g., counter to the desired order, being placed on the respective order books to rest (or give the appearance that there is an order resting) and presented via the market data feed, electronically communicated to the market participants, to appear available to trade in order to solicit the desired orders from the market participants. Depending on the number of component financial instruments involved, and whether those component financial instruments further comprise component financial instruments of their own, there may be numerous implied opportunities, the submission of a counter order in response thereto, that would allow the incoming order to be at least partially matched.

Implied opportunities, e.g., the advertised synthetic orders, may frequently have better prices than the corresponding real orders in the same contract. This can occur when two or more traders incrementally improve their order prices in the hope of attracting a trade, since combining the small improvements from two or more real orders can result in a big improvement in their combination. In general, advertising implied opportunities at better prices will encourage traders to enter the opposing orders to trade with them. The more implied opportunities that the match engine of an electronic trading system can calculate/derive, the greater the number of traders entering orders, and the greater the benefits to the exchange from increased transaction volume. However, identifying implied opportunities may be computationally intensive. One response message may trigger the calculations of hundreds or thousands of calculations to determine implied opportunities, which are then published, e.g., as implied messages, via market data feeds. In a high-performance trading system where low transaction latency is important, it may be important to identify and advertise implied opportunities quickly to improve or maintain market participant interest and/or market liquidity.

For example, two different outright orders may be resting on the books or be available to trade or match. The orders may be resting because there are no outright orders that match the resting orders. Thus, each of the orders may wait or rest on the books until an appropriate outright counter-offer comes into the exchange or is placed by a user of the exchange. The orders may be for two different contracts that only differ in delivery dates. It should be appreciated that such orders could be represented as a calendar spread order. Instead of waiting for two appropriate outright orders to be received that would match the two existing or resting orders, the exchange computer system may identify a hypothetical spread order that, if entered into the system as a tradeable spread order, would allow the exchange computer system to match the two outright orders. The exchange may thus advertise or make available a spread order to users of the exchange system that, if matched with a tradeable spread order, would allow the exchange to also match the two resting orders. Thus, the exchange computing system may be configured to detect that the two resting orders may be combined into an order in the spread instrument and accordingly creates an implied order.

In other words, the exchange may imply the counteroffer order by using multiple orders to create the counteroffer order. Examples of spreads include implied IN, implied OUT, 2nd- or multiple-generation, crack spreads, straddle, strangle, butterfly, and pack spreads. Implied IN spread orders are derived from existing outright orders in individual legs. Implied OUT outright orders are derived from a combination of an existing spread order and an existing outright order in one of the individual underlying legs. Implied orders can fill in gaps in the market and allow spreads and outright futures traders to trade in a product where there would otherwise have been little or no available bids and asks.

For example, implied IN spreads may be created from existing outright orders in individual contracts where an outright order in a spread can be matched with other outright orders in the spread or with a combination of orders in the legs of the spread. An implied OUT spread may be created from the combination of an existing outright order in a spread and an existing outright order in one of the individual underlying leg. An implied IN or implied OUT spread may be created when an electronic matching system simultaneously works synthetic spread orders in spread markets and synthetic orders in the individual leg markets without the risk to the trader/broker of being double filled or filled on one leg and not on the other leg.

By linking the spread and outright markets, implied spread trading increases market liquidity. For example, a buy in one contract month and an offer in another contract month in the same futures contract can create an implied market in the corresponding calendar spread. An exchange may match an order for a spread product with another order for the spread product. Some exchanges attempt to match orders for spread products with multiple orders for legs of the spread products. With such systems, every spread product contract is broken down into a collection of legs and an attempt is made to match orders for the legs.

Implied orders, unlike real orders, are generated by electronic trading systems. In other words, implied orders are computer generated orders derived from real orders. The system creates the "derived" or "implied" order and provides the implied order as a market that may be traded against. If a trader trades against this implied order, then the real orders that combined to create the implied order and the resulting market are executed as matched trades. Implied orders generally increase overall market liquidity. The creation of implied orders increases the number of tradeable items, which has the potential of attracting additional traders. Exchanges benefit from increased transaction volume. Transaction volume may also increase as the number of matched trade items increases.

Examples of implied spread trading include those disclosed in U.S. Patent Publication No. 2005/0203826, entitled "Implied Spread Trading System," the entire disclosure of which is incorporated by reference herein and relied upon. Examples of implied markets include those disclosed in U.S. Pat. No. 7,039,610, entitled "Implied Market Trading System," the entire disclosure of which is incorporated by reference herein and relied upon.

In some cases, the outright market for the deferred month or other constituent contract may not be sufficiently active to provide market data (e.g., bid-offer data) and/or trade data. Spread instruments involving such contracts may nonetheless be made available by the exchange. The market data from the spread instruments may then be used to determine a settlement price for the constituent contract. The settlement price may be determined, for example, through a boundary constraint-based technique based on the market data (e.g., bid-offer data) for the spread instrument, as described in U.S. Patent Publication No. 2015/0073962 entitled "Boundary Constraint-Based Settlement in Spread Markets", the entire disclosure of which is incorporated by reference herein and relied upon. Settlement price determination techniques may be implemented to cover calendar month spread instruments having different deferred month contracts.

Referring again to data transaction processing systems, a system may depend on certain rules, logic, and inter-related objects and data. In technical and computing environments, a system may calculate values for multiple objects subject to rules, e.g., business or environment logic, associated with the objects. Certain object types may also depend on other object types. For example, a computing environment may include multiple objects of different types, e.g., base objects and composite objects. A composite object as used herein is an object whose value depends on, is related to, or is influenced by, the values of other objects, such as base objects or other composite objects. For example, a composite object may involve transactions between multiple, e.g., two, base objects. Or, a composite object may define a relationship between other objects. Thus, composite objects depend on the values of other system objects. In one embodiment, a composite object involves or defines a transaction or relationship between at least two other objects. For example, a composite object involves or defines a transaction or relationship between two base objects. A base object may represent an outright order associated with a financial instrument, and a composite object may represent a spread order associated with a financial instrument.

Computing Environment

The embodiments may be described in terms of a distributed computing system. The examples identify a specific set of components useful in a futures and options exchange. However, many of the components and inventive features are readily adapted to other electronic trading environments. The specific examples described herein may teach specific protocols and/or interfaces, although it should be understood that the principles involved may be extended to, or applied in, other protocols and interfaces.

It should be appreciated that the plurality of entities utilizing or involved with the disclosed embodiments, e.g., the market participants, may be referred to by other nomenclature reflecting the role that the particular entity is performing with respect to the disclosed embodiments and that a given entity may perform more than one role depending upon the implementation and the nature of the particular transaction being undertaken, as well as the entity's contractual and/or legal relationship with another market participant and/or the exchange.

An exemplary trading network environment for implementing trading systems and methods is shown in FIG. 1. An exchange computer system 100 receives messages that include orders and transmits market data related to orders and trades to users, such as via wide area network 162 and/or local area network 160 and computer devices 120, 152, 154, 156 and 158, as described herein, coupled with the exchange computer system 100.

Herein, the phrase "coupled with" is defined to mean directly connected to or indirectly connected through one or more intermediate components. Such intermediate components may include both hardware- and software-based components. Further, to clarify the use in the pending claims and to hereby provide notice to the public, the phrases "at least one of <A>, <B>, . . . and <N>" or "at least one of <A>, <B>, . . . <N>, or combinations thereof" are defined by the Applicant in the broadest sense, superseding any other implied definitions hereinbefore or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

Figure 2:
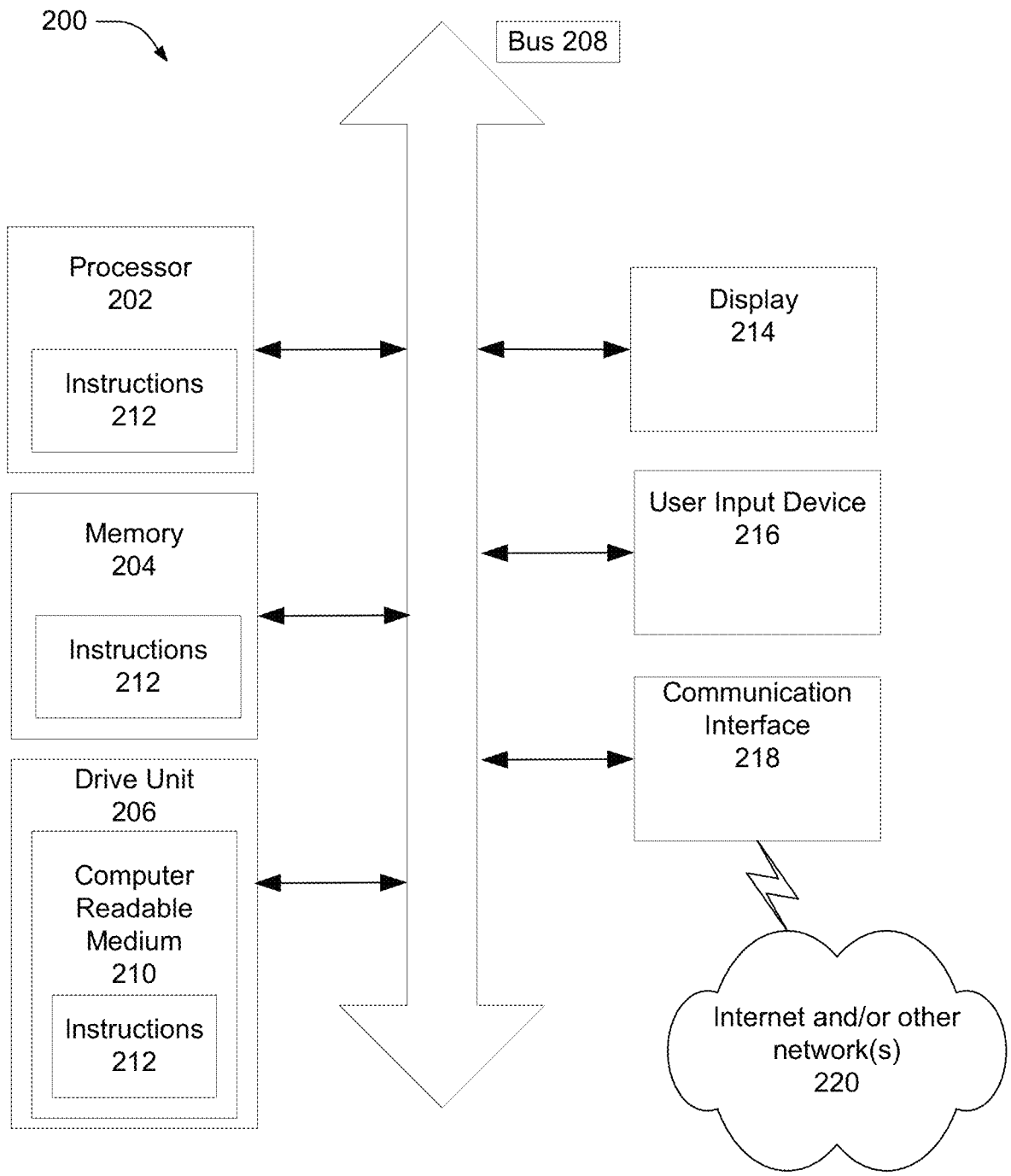
FIG. 2 depicts a general computer system, according to some embodiments.

The exchange computer system 100 may be implemented with one or more mainframes, desktops, or other computers, such as the example computer 200 described herein with respect to FIG. 2. A user database 102 may be provided which includes information identifying traders and other users of exchange computer system 100, such as account numbers or identifiers, usernames, and passwords. An account data module 104 may be provided which may process account information that may be used during trades. The account data module 104 may store relationship information for the participants of the exchange. For example, the account data module 104 may store credit relationship data that defines credit relationships between participants. The account data module 104 may store data that defines which participants other participants are willing to trade with or otherwise complete contracts. Certain participants, for example, may wish to avoid trading with a competitor or otherwise unwelcome trading partner. Certain participants may be denied the opportunity to trade with other participants due to regulatory actions or legal reasons.

A match engine module 106 may be included to match bid and offer prices and may be implemented with software that executes one or more algorithms for matching bids and offers. A trade database 108 may be included to store information identifying trades and descriptions of trades. Trade database 108 may store information identifying the time that a trade took place and the contract price.

An order book module 110 may be included to compute or otherwise determine current bid and offer prices, e.g., in a continuous auction market, or also operate as an order accumulation buffer for a batch auction market.

A market data module 112 may be included to collect market data and prepare the data for transmission to users. For example, the market data module 112 may prepare the market data feeds described herein.

A risk management module 134 may be included to compute and determine a user's risk utilization in relation to the user's defined risk thresholds. The risk management module 134 may also be configured to determine risk assessments or exposure levels in connection with positions held by a market participant. The risk management module 134 may be configured to administer, manage, or maintain one or more margining mechanisms implemented by the exchange computer system 100. Such administration, management or maintenance may include managing database records reflective of margin accounts of the market participants. In some embodiments, the risk management module 134 implements one or more aspects of the disclosed embodiments, including, for instance, principal component analysis (PCA) based margining, in connection with interest rate swap (IRS) portfolios, as described herein.

A message management module 116 may be included to, among other things, receive, and extract orders from, electronic data transaction request messages. The message management module 116 may define a point of ingress into the exchange computer system 100 where messages are ordered and considered to be received by the system. This may be considered a point of determinism in the exchange computer system 100 that defines the earliest point where the system can ascribe an order of receipt to arriving messages. The point of determinism may or may not be at or near the demarcation point between the exchange computer system 100 and a public/internet network infrastructure. The message management module 116 processes messages by interpreting the contents of a message based on the message transmit protocol, such as the transmission control protocol ("TCP"), to provide the content of the message for further processing by the exchange computer system.

The message management module 116 may also be configured to detect characteristics of an order for a transaction to be undertaken in an electronic marketplace. For example, the message management module 116 may identify and extract order content such as a price, product, volume, and associated market participant for an order. The message management module 116 may also identify and extract data indicating an action to be executed by the exchange computer system 100 with respect to the extracted order. For example, the message management module 116 may determine the transaction type of the transaction requested in each message. A message may include an instruction to perform a type of transaction. The transaction type may be, in one embodiment, a request/offer/order to either buy or sell a specified quantity or units of a financial instrument at a specified price or value. The message management module 116 may also identify and extract other order information and other actions associated with the extracted order. All extracted order characteristics, other information, and associated actions extracted from a message for an order may be collectively considered an order as described and referenced herein.

Order or message characteristics may include, for example, the state of the system after a message is received, arrival time (e.g., the time a message arrives at the Market Segment Gateway ("MSG") that is the point of ingress/entry and/or egress/departure for all transactions, i.e., the network traffic/packets containing the data therefore), message type (e.g., new, modify, cancel), and the number of matches generated by a message. Order or message characteristics may also include market participant side (e.g., buyer or seller) or time in force (e.g., a good until end of day order that is good for the full trading day, a good until canceled order that rests on the order book until matched, or a fill or kill order that is canceled if not filled immediately, or a fill and kill order (FOK) that is filled to the maximum amount possible based on the state of the order book at the time the FOK order is processed, and any remaining or unfilled/unsatisfied quantity is not stored on the books or allowed to rest).

An order processing module 136 (or order processor 136) may be included to decompose delta-based, spread instrument, bulk, and other types of composite orders for processing by the order book module 110 and/or the match engine module 106. The order processing module 136 may also be used to implement one or more procedures related to clearing an order. The order may be communicated from the message management module 116 to the order processing module 136. The order processing module 136 may be configured to interpret the communicated order, and manage the order characteristics, other information, and associated actions as they are processed through an order book module 110 and eventually transacted on an electronic market. For example, the order processing module 136 may store the order characteristics and other content and execute the associated actions. In an embodiment, the order processing module 136 may execute an associated action of placing the order into an order book for an electronic trading system managed by the order book module 110. In an embodiment, placing an order into an order book and/or into an electronic trading system may be considered a primary action for an order. The order processing module 136 may be configured in various arrangements and may be configured as part of the order book module 110, part of the message management module 116, or as an independent functioning module. The order processing module 136 may be configured to perform one or more market integrity checks for incoming transactions.

In an embodiment, the order processing module 136 may include one or more market integrity processors that implement market integrity mechanisms such as credit limits, credit banding, velocity logic, or circuit breakers as described below.

As an intermediary to electronic trading transactions, the exchange bears a certain amount of risk in each transaction that takes place. To that end, the clearing house implements risk management mechanisms to protect the exchange. One or more of the modules of the exchange computer system 100 may be configured to determine settlement prices for constituent contracts, such as deferred month contracts, of spread instruments, such as for example, settlement module 140. A settlement module 140 (or settlement processor or other payment processor) may be included to provide one or more functions related to settling or otherwise administering transactions cleared by the exchange. Settlement module 140 of the exchange computer system 100 may implement one or more settlement price determination techniques. Settlement-related functions need not be limited to actions or events occurring at the end of a contract term. For instance, in some embodiments, settlement-related functions may include or involve daily or other mark to market settlements for margining purposes. In some cases, the settlement module 140 may be configured to communicate with the trade database 108 (or the memory(ies) on which the trade database 108 is stored) and/or to determine a payment amount based on a spot price, the price of the futures contract or other financial instrument, or other price data, at various times. The determination may be made at one or more points in time during the term of the financial instrument in connection with a margining mechanism. For example, the settlement module 140 may be used to determine a mark to market amount on a daily basis during the term of the financial instrument. Such determinations may also be made on a settlement date for the financial instrument for the purposes of final settlement.

In some embodiments, the settlement module 140 may be integrated to any desired extent with one or more of the other modules or processors of the exchange computer system 100. For example, the settlement module 140 and the risk management module 134 may be integrated to any desired extent. In some cases, one or more margining procedures or other aspects of the margining mechanism(s) may be implemented by the settlement module 140.

One or more of the above-described modules of the exchange computer system 100 may be used to gather or obtain data to support the settlement price determination, as well as a subsequent margin requirement determination. For example, the order book module 110 and/or the market data module 112 may be used to receive, access, or otherwise obtain market data, such as bid-offer values of orders currently on the order books. The trade database 108 may be used to receive, access, or otherwise obtain trade data indicative of the prices and volumes of trades that were recently executed in a number of markets. In some cases, transaction data (and/or bid/ask data) may be gathered or obtained from open outcry pits (where traders, or their representatives, all physically stand in a designated location, i.e., a trading pit, and trade with each other via oral and visual/hand based communication) and/or other sources and incorporated into the trade and market data from the electronic trading system(s). It should be appreciated that concurrent processing limits may be defined by or imposed separately or in combination on one or more of the trading system components.

The disclosed mechanisms may be implemented at any logical and/or physical point(s), or combinations thereof, at which the relevant information/data (e.g., message traffic and responses thereto) may be monitored or flows or is otherwise accessible or measurable, including one or more gateway devices, modems, the computers or terminals of one or more market participants, e.g., client computers, etc.

One skilled in the art will appreciate that one or more modules described herein may be implemented using, among other things, a tangible computer-readable medium comprising computer-executable instructions (e.g., executable software code). Alternatively, modules may be implemented as software code, firmware code, specifically configured hardware or processors, and/or a combination of the aforementioned. For example, the modules may be embodied as part of an exchange computer system 100 for financial instruments. It should be appreciated that the disclosed embodiments may be implemented as a different or separate module of the exchange computer system 100, or a separate computer system coupled with the exchange computer system 100 to have access to margin account record, pricing, and/or other data. As described herein, the disclosed embodiments may be implemented as a centrally accessible system or as a distributed system, e.g., where some of the disclosed functions are performed by the computer systems of the market participants.

The trading network environment shown in FIG. 1 includes exemplary computer devices 150, 152, 154, 156 and 158 which depict different exemplary methods or media by which a computer device may be coupled with the exchange computer system 100 or by which a user may communicate, e.g., send and receive, trade or other information therewith. It should be appreciated that the types of computer devices deployed by traders and the methods and media by which they communicate with the exchange computer system 100 is implementation dependent and may vary and that not all of the depicted computer devices and/or means/media of communication may be used and that other computer devices and/or means/media of communications, now available or later developed may be used. Each computer device, which may comprise a computer 200 described in more detail with respect to FIG. 2, may include a central processor, specifically configured or otherwise, that controls the overall operation of the computer and a system bus that connects the central processor to one or more conventional components, such as a network card or modem. Each computer device may also include a variety of interface units and drives for reading and writing data or files and communicating with other computer devices and with the exchange computer system 100. Depending on the type of computer device, a user can interact with the computer with a keyboard, pointing device, microphone, pen device or other input device now available or later developed.

An exemplary computer device 150 is shown directly connected to exchange computer system 100, such as via a T1 line, a common local area network (LAN) or other wired and/or wireless medium for connecting computer devices, such as the network 220 shown in FIG. 2 and described with respect thereto. The exemplary computer device 150 is further shown connected to a radio 168. The user of radio 168, which may include a cellular telephone, smart phone, or other wireless proprietary and/or non-proprietary device, may be a trader or exchange employee. The radio user may transmit orders or other information to the exemplary computer device 150 or a user thereof. The user of the exemplary computer device 150, or the exemplary computer device 150 alone and/or autonomously, may then transmit the trade or other information to the exchange computer system 100.

Exemplary computer devices 152 and 154 are coupled with a local area network ("LAN") 160 which may be configured in one or more of the well-known LAN topologies, e.g., star, daisy chain, etc., and may use a variety of different protocols, such as Ethernet, TCP/IP, etc. The exemplary computer devices 152 and 154 may communicate with each other and with other computer and other devices which are coupled with the LAN 160. Computer and other devices may be coupled with the LAN 160 via twisted pair wires, coaxial cable, fiber optics or other wired or wireless media. As shown in FIG. 1, an exemplary wireless personal digital assistant device ("PDA") 158, such as a mobile telephone, tablet-based computer device, or other wireless device, may communicate with the LAN 160 and/or the Internet 162 via radio waves, such as via Wi-Fi, Bluetooth® and/or a cellular telephone-based data communications protocol. PDA 158 may also communicate with exchange computer system 100 via a conventional wireless hub 164.

FIG. 1 also shows the LAN 160 coupled with a wide area network ("WAN") 162 which may be comprised of one or more public or private wired or wireless networks. In one embodiment, the WAN 162 includes the Internet 162. The LAN 160 may include a router to connect LAN 160 to the Internet 162. Exemplary computer device 156 is shown coupled directly to the Internet 162, such as via a modem, DSL line, satellite dish or any other device for connecting a computer device to the Internet 162 via a service provider therefore as is known. LAN 160 and/or WAN 162 may be the same as the network 220 shown in FIG. 2 and described with respect thereto.

Users of the exchange computer system 100 may include one or more market makers 130 which may maintain a market by providing constant bid and offer prices for a derivative or security to the exchange computer system 100, such as via one of the exemplary computer devices depicted. The exchange computer system 100 may also exchange information with other match or trade engines, such as trade engine 138. One skilled in the art will appreciate that numerous additional computers and systems may be coupled to exchange computer system 100. Such computers and systems may include clearing, regulatory and fee systems.

The operations of computer devices and systems shown in FIG. 1 may be controlled by computer-executable instructions stored on a non-transitory computer-readable medium. For example, the exemplary computer device 152 may store computer-executable instructions for receiving order information from a user, transmitting that order information to exchange computer system 100 in electronic messages, extracting the order information from the electronic messages, executing actions relating to the messages, and/or calculating values from characteristics of the extracted order to facilitate matching orders and executing trades. In another example, the exemplary computer device 150 may include computer-executable instructions for receiving market data from exchange computer system 100 and displaying that information to a user.

Numerous additional servers, computers, handheld devices, personal digital assistants, telephones, and other devices may also be connected to exchange computer system 100. Moreover, one skilled in the art will appreciate that the topology shown in FIG. 1 is merely an example and that the components shown in FIG. 1 may include other components not shown and be connected by numerous alternative topologies.

Referring now to FIG. 2, an illustrative embodiment of a general computer system 200 is shown. The computer system 200 can include a set of instructions that can be executed to cause the computer system 200 to perform any one or more of the methods or computer-based functions disclosed herein. The computer system 200 may operate as a standalone device or may be connected, e.g., using a network, to other computer systems or peripheral devices. Any of the components discussed herein, such as processor 202, may be a computer system 200 or a component in the computer system 200. The computer system 200 may be specifically configured to implement a match engine, margin processing, payment or clearing function on behalf of an exchange, such as the Chicago Mercantile Exchange Inc., of which the disclosed embodiments are a component thereof.

In a networked deployment, the computer system 200 may operate in the capacity of a server or as a client user computer in a client-server user network environment, or as a peer computer system in a peer-to-peer (or distributed) network environment. The computer system 200 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In an embodiment, the computer system 200 can be implemented using electronic devices that provide voice, video, or data communication. Further, while a single computer system 200 is illustrated, the term "system" shall also be taken to include any collection of systems or sub-systems that individually or jointly execute a set, or multiple sets, of instructions to perform one or more computer functions.

As illustrated in FIG. 2, the computer system 200 may include a processor 202, e.g., a central processing unit (CPU), a graphics processing unit (GPU), or both. The processor 202 may be a component in a variety of systems. For example, the processor 202 may be part of a standard personal computer or a workstation. The processor 202 may be one or more general processors, digital signal processors, specifically configured processors, application specific integrated circuits, field programmable gate arrays, servers, networks, digital circuits, analog circuits, combinations thereof, or other now known or later developed devices for analyzing and processing data. The processor 202 may implement a software program, such as code generated manually (i.e., programmed).

The computer system 200 may include a memory 204 that can communicate via a bus 208. The memory 204 may be a main memory, a static memory, or a dynamic memory. The memory 204 may include, but is not limited to, computer-readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one embodiment, the memory 204 includes a cache or random-access memory for the processor 202. In alternative embodiments, the memory 204 is separate from the processor 202, such as a cache memory of a processor, the system memory, or other memory. The memory 204 may be an external storage device or database for storing data. Examples include a hard drive, compact disc ("CD"), digital video disc ("DVD"), memory card, memory stick, floppy disk, universal serial bus ("USB") memory device, or any other device operative to store data. The memory 204 is operable to store instructions executable by the processor 202. The functions, acts or tasks illustrated in the figures or described herein may be performed by the programmed processor 202 executing the instructions 212 stored in the memory 204. The functions, acts or tasks are independent of the particular type of instructions set, storage media, processor or processing strategy and may be performed by software, hardware, integrated circuits, firmware, microcode and the like, operating alone or in combination. Likewise, processing strategies may include multiprocessing, multitasking, parallel processing and the like.

As shown, the computer system 200 may further include a display unit 214, such as a liquid crystal display (LCD), an organic light emitting diode (OLED), a flat panel display, a solid-state display, a cathode ray tube (CRT), a projector, a printer or other now known or later developed display device for outputting determined information. The display 214 may act as an interface for the user to see the functioning of the processor 202, or specifically as an interface with the software stored in the memory 204 or in the drive unit 206.

Additionally, the computer system 200 may include an input device 216 configured to allow a user to interact with any of the components of system 200. The input device 216 may be a number pad, a keyboard, or a cursor control device, such as a mouse, or a joystick, touch screen display, remote control, or any other device operative to interact with the system 200.

In an embodiment, as depicted in FIG. 2, the computer system 200 may also include a disk or optical drive unit 206. The disk drive unit 206 may include a computer-readable medium 210 in which one or more sets of instructions 212, e.g., software, can be embedded. Further, the instructions 212 may embody one or more of the methods or logic as described herein. In an embodiment, the instructions 212 may reside completely, or at least partially, within the memory 204 and/or within the processor 202 during execution by the computer system 200. The memory 204 and the processor 202 also may include computer-readable media as discussed herein.

The present disclosure contemplates a computer-readable medium that includes instructions 212 or receives and executes instructions 212 responsive to a propagated signal, so that a device connected to a network 220 can communicate voice, video, audio, images, or any other data over the network 220. Further, the instructions 212 may be transmitted or received over the network 220 via a communication interface 218. The communication interface 218 may be a part of the processor 202 or may be a separate component. The communication interface 218 may be created in software or may be a physical connection in hardware. The communication interface 218 is configured to connect with a network 220, external media, the display 214, or any other components in system 200, or combinations thereof. The connection with the network 220 may be a physical connection, such as a wired Ethernet connection or may be established wirelessly. Likewise, the additional connections with other components of the system 200 may be physical connections or may be established wirelessly.

The network 220 may include wired networks, wireless networks, or combinations thereof. The wireless network may be a cellular telephone network, an 802.11, 802.16, 802.20, or WiMAX network. Further, the network 220 may be a public network, such as the Internet, a private network, such as an intranet, or combinations thereof, and may utilize a variety of networking protocols now available or later developed including, but not limited to, TCP/IP based networking protocols.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer-readable medium for execution by, or to control the operation of, data processing apparatus. While the computer-readable medium is shown to be a single medium, the term "computer-readable medium" includes a single medium or multiple medium, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein. The computer-readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

In a non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated or otherwise specifically configured hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionalities as described herein.

Although the present specification describes components and functions that may be implemented in some embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and anyone or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical discs, or optical discs. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical discs; and CD ROM and DVD-ROM discs. The processor and the memory can be supplemented by, or incorporated in, special purpose logic circuitry.

As used herein, the terms "microprocessor" or "general-purpose processor" ("GPP") may refer to a hardware device that fetches instructions and data from a memory or storage device and executes those instructions (for example, an Intel Xeon processor or an AMD Opteron processor) to then, for example, process the data in accordance therewith. The term "reconfigurable logic" may refer to any logic technology whose form and function can be significantly altered (i.e., reconfigured) in the field post-manufacture as opposed to a microprocessor, whose function can change post-manufacture, e.g., via computer executable software code, but whose form, e.g., the arrangement/layout and interconnection of logical structures, is fixed at manufacture. The term "software" may refer to data processing functionality that is deployed on a GPP. The term "firmware" may refer to data processing functionality that is deployed on reconfigurable logic. One example of a reconfigurable logic is a field programmable gate array ("FPGA") which is a reconfigurable integrated circuit. An FPGA may contain programmable logic components called "logic blocks", and a hierarchy of reconfigurable interconnects that allow the blocks to be "wired together", somewhat like many (changeable) logic gates that can be inter-wired in (many) different configurations. Logic blocks may be configured to perform complex combinatorial functions, or merely simple logic gates like AND, OR, NOT and XOR. An FPGA may further include memory elements, which may be simple flip-flops or more complete blocks of memory.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well. Feedback provided to the user can be any form of sensory feedback, e.g., visual feedback, auditory feedback, or tactile feedback. Input from the user can be received in any form, including acoustic, speech, or tactile input.

Embodiments of the subject matter described in this specification can be implemented in a computing system that includes a back-end component, e.g., a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

It should be appreciated that the disclosed embodiments may be applicable to other types of messages depending upon the implementation. Further, the messages may comprise one or more data packets, datagrams or other collection of data formatted, arranged configured and/or packaged in a particular one or more protocols, e.g., the FIX protocol, TCP/IP, Ethernet, etc., suitable for transmission via a network 214 as was described, such as the message format and/or protocols described in U.S. Pat. No. 7,831,491 and U.S. Patent Publication No. 2005/0096999 A1, both of which are incorporated by reference herein in their entireties and relied upon. Further, the disclosed message management system may be implemented using an open message standard implementation, such as FIX, FIX Binary, FIX/FAST, or by an exchange-provided API.

Order Book Object Data Structures

Figures 3A, 3B, 3C:
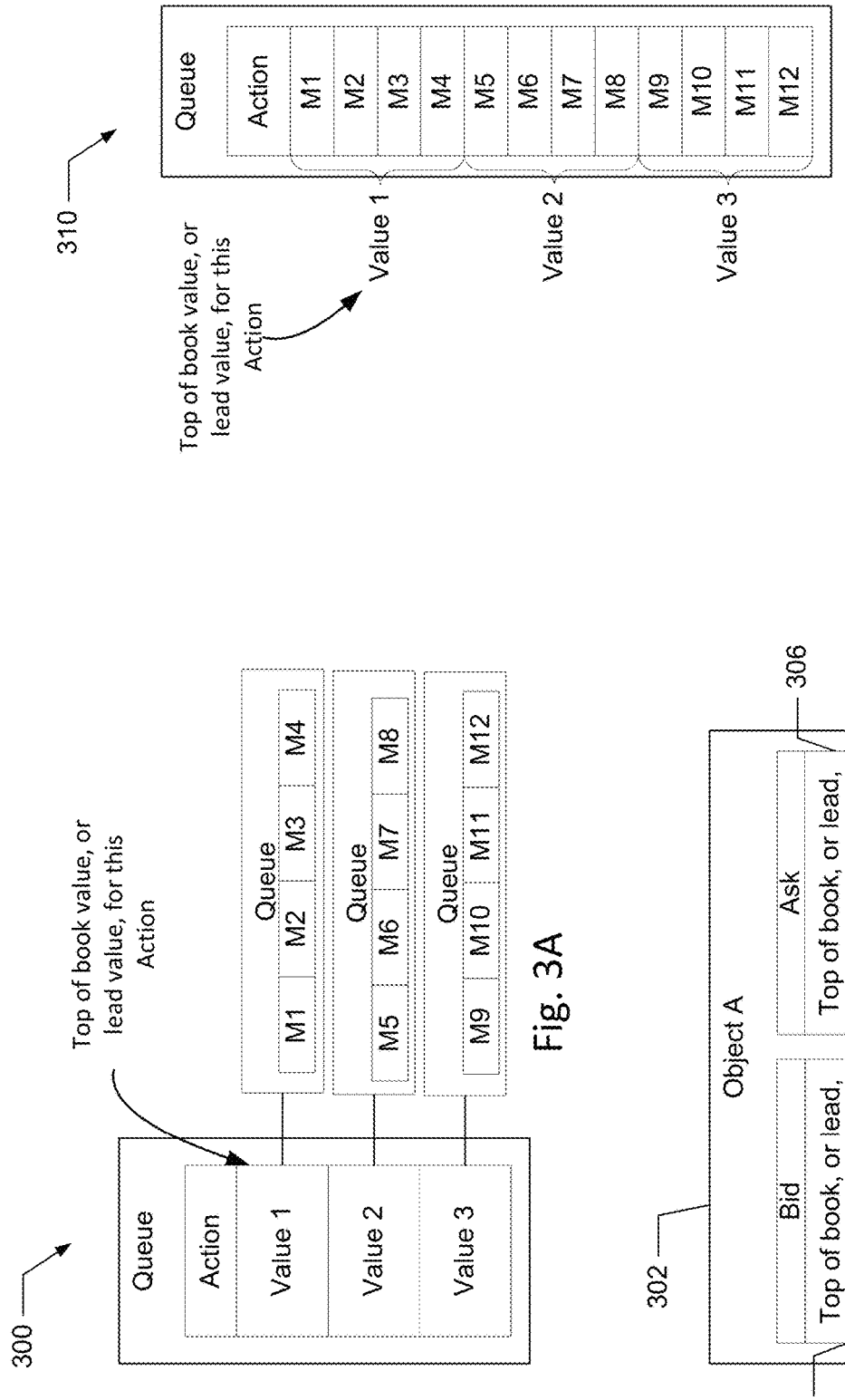
FIG. 3A depicts a storage data structure, according to some embodiments.
FIG. 3B depicts another storage data structure, according to some embodiments.
FIG. 3C depicts yet another data structure, according to some embodiments.

In one embodiment, the messages and/or values received for each object may be stored in queues according to value and/or priority techniques implemented by an exchange computing system 100. FIG. 3A illustrates an example data structure 300, which may be stored in a memory or other storage device, such as the memory 204 or storage device 206 described with respect to FIG. 2, for storing and retrieving messages related to different values for the same action for an object. For example, data structure 300 may be a set of queues or linked lists for multiple values for an action, e.g., bid, on an object. Data structure 300 may be implemented as a database. It should be appreciated that the system may store multiple values for the same action for an object, for example, because multiple users submitted messages to buy specified quantities of an object at different values. Thus, in one embodiment, the exchange computing system may keep track of different orders or messages for buying or selling quantities of objects at specified values.

Although the present application contemplates using queue data structures for storing messages in a memory, the implementation may involve additional pointers, i.e., memory address pointers, or linking to other data structures. Incoming messages may be stored at an identifiable memory address. The data transaction processor can traverse messages in order by pointing to and retrieving different messages from the different memories. Thus, messages that may be depicted sequentially, e.g., in FIG. 3B below, may be stored in memory in disparate locations. The software programs implementing the transaction processing may retrieve and process messages in sequence from the various disparate (e.g., random) locations. Thus, in one embodiment, each queue may store different values, which could represent prices, where each value points to or is linked to the messages (which may themselves be stored in queues and sequenced according to priority techniques, such as prioritizing by value) that will match at that value. For example, as shown in FIG. 3A, all the values relevant to executing an action at different values for an object are stored in a queue. Each value in turn points to, e.g., a linked list or queue logically associated with the values. The linked list stores the messages that instruct the exchange computing system to buy specified quantities of the object at the corresponding value.

The sequence of the messages in the message queues connected to each value may be determined by exchange implemented priority techniques. For example, in FIG. 3A, messages M1, M2, M3 and M4 are associated with performing an action (e.g., buying or selling) a certain number of units (may be different for each message) at Value 1. M1 has priority over M2, which has priority over M3, which has priority over M4. Thus, if a counter order matches at Value 1, the system fills as much quantity as possible associated with M1 first, then M2, then M3, and then M4.

In the illustrated examples, the values may be stored in sequential order, and the best or lead value for a given queue may be readily retrievable by and/or accessible to the disclosed system. Thus, in one embodiment, the value having the best priority may be illustrated as being in the topmost position in a queue, although the system may be configured to place the best priority message in some other predetermined position. In the example of FIG. 3A, Value 1 is shown as being the best value or lead value, or the top of the book value, for an example Action.

A lead acquisition value may be the best or lead value in an acquisition queue of an order book object, and a lead relinquish value may be the best or lead value in a relinquish queue of the order book object.

FIG. 3B illustrates an example alternative data structure 310 for storing and retrieving messages and related values. It should be appreciated that matches occur based on values, and so all the messages related to a given value may be prioritized over all other messages related to a different value. As shown in FIG. 3B, the messages may be stored in one queue and grouped by values according to the hierarchy of the values. The hierarchy of the values may depend on the action to be performed.

For example, if a queue is a sell queue (e.g., the Action is Sell), the lowest value may be given the best priority and the highest value may be given the lowest priority. Thus, as shown in FIG. 3B, if Value 1 is lower than Value 2 which is lower than Value 3, Value 1 messages may be prioritized over Value 2, which in turn may be prioritized over Value 3.

Within Value 1, M1 is prioritized over M2, which in turn is prioritized over M3, which in turn is prioritized over M4. Within Value 2, M5 is prioritized over M6, which in turn is prioritized over M7, which in turn is prioritized over M8. Within Value 3, M9 is prioritized over M10, which in turn is prioritized over M11, which in turn is prioritized over M12.

Alternatively, the messages may be stored in a tree-node data structure that defines the priorities of the messages. In one embodiment, the messages may make up the nodes.

In one embodiment, the system may traverse through a number of different values and associated messages when processing an incoming message. Traversing values may involve the processor loading each value, checking that value, and deciding whether to load another value, i.e., by accessing the address pointed at by the address pointer value. In particular, referring to FIG. 3B, if the queue is for selling an object for the listed Values 1, 2 and 3 (where Value 1 is lower than Value 2 which is lower than Value 3), and if the system receives an incoming aggressing order to buy quantity X at a Value 4 that is greater than Values 1, 2, and 3, the system will fill as much of quantity X as possible by first traversing through the messages under Value 1 (in sequence M1, M2, M3, M4). If any of the quantity of X remains, the system traverses down the prioritized queue until all the incoming order is filled (e.g., all of X is matched) or until all the quantities of M1 through M12 are filled. Any remaining, unmatched quantity remains on the books, e.g., as a resting order at Value 4, which was the entered value or the message's value.

The system may traverse the queues and check the values in a queue, and upon finding the appropriate value, may locate the messages involved in making that value available to the system. When an outright message value is stored in a queue, and when that outright message is involved in a trade or match, the system may check the queue for the value, and then may check the data structure storing messages associated with that value.

In one embodiment, an exchange computing system may convert all financial instruments to objects. In one embodiment, an object may represent the order book for a financial instrument. Moreover, in one embodiment, an object may be defined by two queues, one queue for each action that can be performed by a user on the object. For example, an order book converted to an object may be represented by an Ask queue and a Bid queue. Resting messages or orders associated with the respective financial instrument may be stored in the appropriate queue and recalled therefrom.

In one embodiment, the messages associated with objects may be stored in specific ways depending on the characteristics of the various messages and the states of the various objects in memory. For example, a system may hold certain resting messages in queue until the message is to be processed, e.g., the message is involved in a match. The order, sequence or priority given to messages may depend on the characteristics of the message. For example, in certain environments, messages may indicate an action that a computer in the system should perform. Actions may be complementary actions or require more than one message to complete. For example, a system may be tasked with matching messages or actions contained within messages. The messages that are not matched may be queued by the system in a data queue or other structure, e.g., a data tree having nodes representing messages or orders.

The queues are structured so that the messages are stored in sequence according to priority. Although the embodiments are disclosed as being implemented in queues, it should be understood that different data structures such as for example linked lists or trees may also be used.

The system may include separate data structures, e.g., queues, for different actions associated with different objects within the system. For example, in one embodiment, the system may include a queue for each possible action that can be performed on an object. The action may be associated with a value. The system prioritizes the actions based in part on the associated value.

For example, as shown in FIG. 3C, the order book module of a computing system may include several paired queues, such as queues Bid and Ask for an object 302 (e.g., Object A). The system may include two queues, or one pair of queues, for each object that is matched or processed by the system. In one embodiment, the system stores messages in the queues that have not yet been matched or processed. FIG. 3C may be an implementation of the data structures disclosed in FIGS. 3A and/or 3B. Each queue may have a top of book, or lead, position, such as positions 304 and 306, which stores data that is retrievable.

The queues may define the priority or sequence in which messages are processed upon a match event. For example, two messages stored in a queue may represent performing the same action at the same value. When a third message is received by the system that represents a matching action at the same value, the system may need to select one of the two waiting, or resting, messages as the message to use for a match. Thus, when multiple messages can be matched at the same value, the exchange may have a choice or some flexibility regarding the message that is matched. The queues may define the priority in which orders that are otherwise equivalent (e.g., same action for the same object at the same value) are processed.

The system may include a pair of queues for each object, e.g., a bid and ask queue for each object. Each queue may be for example implemented utilizing the data structure of FIG. 3B. The exchange may be able to specify the conditions upon which a message for an object should be placed in a queue. For example, the system may include one queue for each possible action that can be performed on an object. The system may be configured to process messages that match with each other. In one embodiment, a message that indicates performing an action at a value may match with a message indicating performing a corresponding action at the same value. Or, the system may determine the existence of a match when messages for the same value exist in both queues of the same object. The messages may be received from the same or different users or traders.

The queues illustrated in FIG. 3C hold or store messages received by a computing exchange, e.g., messages submitted by a user to the computing exchange, and waiting for a proper match. It should be appreciated that the queues may also hold or store implieds, e.g., implied messages generated by the exchange system, such as messages implied in or implied out as described herein. The system thus adds messages to the queues as they are received, e.g., messages submitted by users, or generated, e.g., implied messages generated by the exchanges. The sequence or prioritization of messages in the queues is based on information about the messages and the overall state of the various objects in the system.

When the data transaction processing system is implemented as an exchange computing system, as discussed above, different client computers submit electronic data transaction request messages to the exchange computing system. Electronic data transaction request messages include requests to perform a transaction on a data object, e.g., at a value for a quantity. The exchange computing system includes a data transaction processor, e.g., a hardware matching processor or match engine, that matches, or attempts to match, pairs of messages with each other. For example, messages may match if they contain counter instructions (e.g., one message includes instructions to buy, the other message includes instructions to sell) for the same product at the same value. In some cases, depending on the nature of the message, the value at which a match occurs may be the submitted value or a better value. A better value may mean higher or lower value depending on the specific transaction requested. For example, a buy order may match at the submitted buy value or a lower (e.g., better) value. A sell order may match at the submitted sell value or a higher (e.g., better) value.

Dynamic Circuit Breakers

As was described above, static (downstream) circuit breakers have been used to protect market integrity. These circuit breakers sit outside of the trading system and listen, parallel with the market participants, to the ongoing market activity via the market data feed and set a range of allowable price movement levels per product. A price limit is the maximum price range permitted for a futures contract in each trading session. When markets hit the price limit, different actions occur depending on the product being traded. Markets may temporarily halt until price limits can be expanded, remain in a limit condition, or stop trading for the day, based on regulatory rules.

Static circuit breakers have been used in conjunction with other market integrity checks such as price banding, price limits, and velocity logic to prevent market disruptions. Each mechanism may serve to prevent similar or different types of disruptions in different ways. For example, static circuit breakers have been used as a hard limit on market movements over the entirety of the trading day. As detailed above, static circuit breakers monitor the downstream market data feed indicative of what has generally happened in the market and act as price limits, slowing down or stopping trading as markets reach certain price points set and defined at the start of the trading session. As static circuit breakers are both reactionary, generalized and inert, they are limited in their ability to detect disruptions and further take appropriate actions, such as minimize communication of unnecessary messages, when the static circuit breaker is triggered.

Dynamic circuit breakers are an enhancement to the static circuit breakers. Instead of monitoring a downstream market data feed like the static circuit breakers, dynamic circuit breakers are implemented in line (or in parallel) with the matching and order processing. For example, circuit breakers, such as static circuit breakers, which are located downstream learn about and react to a triggering event after the event has occurred, affected the market and the market participants have been notified. Dynamic circuit breakers leverage the functionality of being located in line, or parallel with, the matching and order processing functions to provide preemptory/proactive, instead of reactionary, capabilities. That is, a dynamic circuit breaker may be triggered upon detection of a transaction that will (but has not yet), if processed to completion, cause a market event, e.g., one that once completed would have triggered a static circuit breaker. By using dynamic circuit breakers located in line, e.g., prior to the order book database being altered or messages generated by the match engine being sent out to participants, with the trading system, selective/enhanced checking and actions may be performed and unnecessary notifications/market data feed messages may be avoided. Dynamic circuit breakers may improve market integrity controls by including enhanced checks (including relying on non-trading information and participant type, data which is not available to static circuit breakers due to the limited information conveyed by the market data feed) for determining whether corrective action is needed and more comprehensive and appropriate actions as a result of being triggered.

For example, in certain embodiments, the disclosed systems include enhanced checks that leverage information not otherwise available external to the trading system, e.g. via the market data feed, to allow for the ability to track price movements based upon particular activities/orders/order types, participant type, e.g., market maker or market taker as described above (for example, a price movement caused by a market maker may be handled differently than such an event caused by a market taker), the ability to utilize reference prices during non-trading states during transition to open trading, the ability to use a time component (e.g., dynamic pre-open times based on participant type), the ability to use dynamic evaluation of the allowable price movement range (e.g., restrict/expand the price movement range based upon market activity), and the ability to use improved range checking after a circuit breaker event among other improvements. It will be appreciated that participants may be classified or otherwise grouped into any one or more "type" groupings for use with the disclosed embodiments to selectively control application of disclosed circuit breaker functionality, such as based on latency of communication (participants who utilize lower, e.g. below a defined threshold, latency communications technologies vs. those that use higher latency communications), nature of the participant, e.g. automated trading system, manual trader, institutional trader, such as a hedge fund, proprietary trader, commercial trader, etc. Such groupings may be implementation dependent. Dynamic circuit breakers and the enhanced checks also allow the dynamic circuit breakers new functionality, such as the ability to short-circuit a market open (e.g., re-open the market immediately if the market reverts to prior price levels), accept or reject orders based upon market participant type or activity (e.g., participants that have set a new top of book three times in a row may be rejected for a certain amount of time, market making activities may be permitted whereas market taking activities rejected regardless of who or what the participant is, some order types, such as Fill and Kill (FAK) may be treated differently from limit order, e.g. a FAK order may be rejected rather than cause a halt due to the fact that it will not rest on the order book, etc.), and selectively/dynamically disable or enable implieds, i.e. implication as described above, to control liquidity in the market to enable or prevent further price movements. For example, implied functionality, may be enabled so as to provide additional liquidity, i.e. increased trading opportunities, using related markets to satisfy incoming orders and thereby preventing or mitigating price movements in the given market. That is, by providing more opportunities for incoming trades to be completed, the number of transactions being rested on the order book at particular prices may be reduced.

Figure 4:
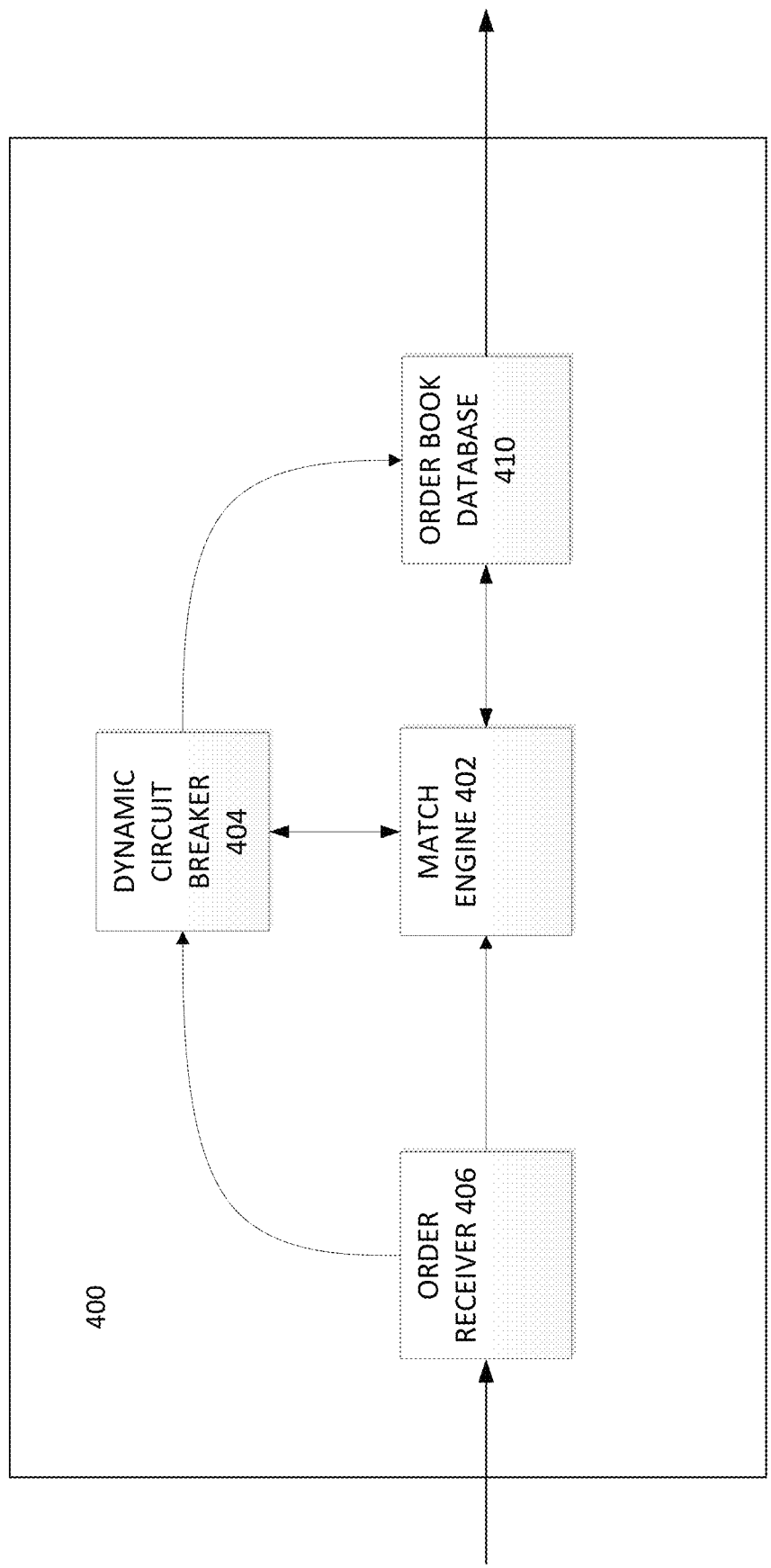
FIG. 4 depicts an example system architecture for performing market integrity checks using a dynamic circuit breaker according to some embodiments.

FIG. 4 depicts an example system 400 configured to control the operation of a match engine 402 using a dynamic circuit breaker 404 in an electronic exchange such as the exchange computing system 100 for electronic transactions, e.g., electronic orders to trade, for any of a set of tradeable instruments, e.g., options contracts, such as options on futures. The dynamic circuit breaker 404 defines an upper and lower limit that a price of a product is allowed to move in a configured time interval. If triggered by an order received at the order receiver 406, the dynamic circuit breaker 404 transitions the order book database 410 into a pre-open state without a monitoring period, thereby halting operation of the match engine 402 and preventing any changes to the order book database 410.

The system 400 may be implemented as a separate component or as one or more logic components, such as the order processing module 136 or the match engine module 106, such as on an FPGA that may include a memory or reconfigurable component to store logic and processing component to execute the stored logic, or as computer program logic, stored in a memory 204, or other non-transitory computer-readable medium, and executable by a processor 202, such as the processor 202 and memory 204 described above with respect to FIG. 2. As depicted, the system 400 includes a match engine 402, an order receiver 406, an order book database 410, and one or more dynamic circuit breakers 404.

The system 400 includes an order receiver 406 that may be implemented or included in the order processing module 136 of FIG. 1 and operative to receive orders communicated thereto, e.g., incoming transactions comprising orders to buy or sell a financial product. The order receiver 406 may be further operative to decompose delta-based, spread instrument, bulk, and other types of composite orders for processing by the order book database 410 and/or the match engine 402. An order may be communicated from the message management module 116 to the order receiver 406 The order receiver 406 may be configured to interpret the communicated order, and manage the order characteristics, other information, and associated actions as they are processed through an order book database 410 and eventually transacted on an electronic market. For example, the order receiver 406 may store the order characteristics and other content and execute the associated actions. In an embodiment, the order receiver 406 may execute an associated action of placing the order into an order book 410 for an electronic trading system. In an embodiment, placing an order into an order book and/or into an electronic trading system may be considered a primary action for an order. The order receiver 406 may be configured in various arrangements and may be configured as part of the order book module 110, part of the message management module 116, or as an independent functioning module.

In an embodiment, an incoming transaction communicated to the match engine 402 may be received at the order receiver 406. The incoming transaction may be from, and therefore associated with, a market participant of an electronic market managed by an electronic trading system. The transaction may involve an order as extracted from a received message and may have an associated action. The actions may involve placing an order to buy or sell a financial product in the electronic market or modifying or deleting such an order. In an embodiment, the financial product may be based on an associated financial instrument which the electronic market is established to trade. In an embodiment, the action associated with the transaction is determined. For example, it may be determined whether the incoming transaction comprises an order to buy or sell a quantity of the associated financial instrument or an order to modify or cancel an existing order in the electronic market. Orders to buy or sell and orders to modify or cancel may be acted upon differently by the electronic market. In an embodiment, data relating to the received transaction is stored. The data may be stored in any device, or using any technique, operable to store and provide recovery of data. For example, a memory 204 or computer-readable medium 210, may be used to store data, as is described above with respect to FIG. 2.

The order receiver 406 may transmit the data, such as in parallel or otherwise, to both the dynamic circuit breaker 404 and/or the match engine 402. Both the dynamic circuit breaker 404 and match engine 402 may process the data to determine an action implemented at the order book database 410. Alternatively, the dynamic circuit breaker 404 may process the data prior to the match engine 402 such that if the dynamic circuit breaker 404 acts to halt the match engine 402, the resources of the match engine 402 are not unnecessarily consumed. The dynamic circuit breaker 404 may generate a command to halt or otherwise freeze the match engine 402 or order book database 410 if triggered. The match engine 402, i.e., if not otherwise halted by the dynamic circuit breaker 404, may generate a command to alter the state of the order book database 410, for example, by matching orders, modifying resting orders, or resting an incoming order in the order book database 410.

In an embodiment, the system 400 includes an order book database 410 that stores a database or data structure in a memory 204 and comprising a plurality of data records, each of which includes data representative of one of a set of financial instruments. In one embodiment, the order book database 410 may be implemented as part of the order book module 110 of the exchange computer system 100. The order book database 410 may be implemented as a separate component or as one or more logic components, such as on an FPGA which may include a memory or reconfigurable component to store logic and a processing component to execute the stored logic, or as first logic, e.g., computer program logic, stored in a memory, such as the memory 204 shown in FIG. 2 and described in more detail above with respect thereto, or other non-transitory computer-readable medium, and executable by a processor, such as the processor 202 shown in FIG. 2 and described in more detail above with respect thereto, to cause the order book database 410 to, or otherwise be operative to store a plurality of data records, each of which includes data representative of the financial instrument.

The data stored in the order book database 410 may reflect a state of a market for the financial instrument. Market and instruments states may be controlled by the system 400 to prevent certain modifications or changes to the state of the market, e.g., data stored in the order book database 410 by, for example, a match engine 402 as detailed below. A trading day on an electronic exchange proceeds through distinct periods, known as market states. A market state defines the types of activity allowed during a time period ensuring market integrity. Market states may be managed automatically by the system 400, the operator, or administrator of the exchange, such as the GCC of CME and disseminated over market data feeds or other messaging mechanisms. Market and instrument states are used by the system 400 to control market and instrument availability and order entry and matching activity. The system 400, the operator, or administrator of the exchange may configure a specific time for each phase in advance of the trading day. Group level settings may be applied to instruments as the default unless changed by the system 400, the operator, or administrator of the exchange. The system 400, the operator, or administrator of the exchange may modify market phases and states in real-time as a result of market conditions (e.g., emergency auctions, market halt). Group states apply to a grouping of related instruments. Instrument states apply to the single given instrument. The dynamic circuit breaker 404 may also automatically directly generate commands or instructions to place the order book database 410 or match engine 402 in different states without additional input from the system 400, the operator, or administrator of the exchange. For example, if the dynamic circuit breaker 404 is triggered, the dynamic circuit breaker 404 may automatically place the order book database 410 in a pre-open state without further input, thereby halting matching by the match engine 402. Various market states as defined by exchange exist, including, for example, pre-open, opening, open, pause, reserve, close, post close, etc. Each state may be defined by the activities allowed during that state. During pre-open, for example, order entry, modification, and cancel are allowed. However, there is no order matching and mass quote messages are not allowed.

The system 400 further includes a match engine 402 that is coupled with the dynamic circuit breaker 404, the order receiver 406, and the order book database 410. The match engine 402 may be implemented as a separate component, e.g., a hardware match engine/matching processor, or as one or more logic components, e.g., second logic, such as on an FPGA that may include a memory or reconfigurable component to store logic and processing component to execute the stored logic, or as computer program logic, stored in the memory 204, or other non-transitory computer-readable medium, and executable by a processor 202, such as the processor 202 and memory 204 described with respect to FIG. 2, to cause the processor 202 to, or otherwise be operative to match received orders with previously received orders and if there is not a full match, store the incoming order or any remainder thereof in the order book database 410. The match engine 402 is further operative to communicate with the market data module 112 to generate market data for transmission to market participants. The match engine 402 (also referred to as a hardware matching processor) is operative to attempt to match incoming orders communicated thereto. The match engine 402 is configured to operate differently in different market states. For example, in pre-open, the order entry, modification, and cancelation of orders is allowed, but the match engine 402 is not permitted to match orders. During the opening, the pre-open orders are resolved following an Indicative Opening Price (IOP) determination. At open, matching by the match engine 402 begins. During operation, the match engine 402 may be paused or halted due to an integrity check performed by a market integrity system such as the dynamic circuit breaker 404.

The system 400 includes one or more dynamic circuit breakers 404. The dynamic circuit breakers 404 may be configured as part of a market integrity module that performs additional monitoring of markets. The dynamic circuit breaker 404, which may be referred to as a market integrity processor, is configured to perform market integrity checks. The market integrity module/market integrity processor may, for example, also provide support for checking price limits or velocity logic systems. In an embodiment, there is a dedicated dynamic circuit breaker 404 for each market or instrument at an exchange. Markets and instruments may also be related so that one or more markets may influence others. An instrument, for example, may be a primary instrument that affects multiple secondary or associated instruments. As an example, in a spread contract, if a dynamic circuit breaker 404 is triggered in the primary contract market (lead month), all associated contract markets will follow the actions that result (e.g., placed in pre-open state as detailed below).

The dynamic circuit breaker(s) 404 is configured to monitor incoming electronic data transaction request messages in the electronic data transaction processing system which are communicated to the match engine/hardware matching processor 402. The dynamic circuit breaker 404 may receive the incoming electronic data transaction messages from the order receiver 406 prior to, or simultaneously with, transmission to the match engine 402. In this way, the dynamic circuit breaker 404 may start the monitoring process prior to a match being determined so that the dynamic circuit breaker 404 may be triggered prior to the order book database 410 being altered or messages generated by the match engine 402 being sent out to participants. For example, after being processed by the match engine 402 each order may be validated by the dynamic circuit breaker 404. Alternatively, each order may be assumed to be validated, whereas the dynamic circuit breaker 404 triggers, e.g., generates data, only if the order trips the conditions set by the dynamic circuit breaker 404. Each incoming message from the order receiver 406 may include a message value and a message quantity. For example, a message may include an instruction to purchase a specified number of units (i.e., message quantity) of a product associated with a data object at a specified value or price (i.e., message value). The dynamic circuit breaker 404 may also receive data from the receiver about the identity of the participant that transmitted the order. The dynamic circuit breaker 404 also receives data from the match engine 402 and/or the order book database 410 detailing the effect the incoming order has on the order book database 410.

The disclosed embodiments may also monitor certain messages or orders for order books maintained on the exchange computing system. The products or order books may be represented as data objects within the exchange computing system, for example, stored in memory in the order book database 410. The monitored messages may be recently received messages (e.g., a limit price on a new incoming order, or a modification of a previous order), or recently triggered messages (e.g., a limit price in a stop order resting on the books that is triggered by a trade at the stop price).

In an embodiment, the dynamic circuit breaker 404 may first determine whether or not an incoming message will actually trade, or cause a match, e.g., with a resting order. For example, a message management module 116, an order extraction module 146, and/or order processing module 136 of an exchange computing system may collectively extract and analyze a message and execute an instruction or action included therewith, including determining whether the message will cause, or be involved in, a match event. If it is determined that the message will cause, or be involved in, a match event, the dynamic circuit breaker 404 may also determine whether the message fully trades (e.g., whether all of the requested quantity of the order is satisfied/matches) or partially trades (e.g., whether only some of the quantity is satisfied/matches and the remaining quantity rests on the book to await a subsequent suitable counter order), and may also determine the trade prices (as opposed to the limit or submitted price) at which quantities will match or trade, e.g., match values. It should be appreciated that in electronic trading systems implemented via an exchange computing system, a trade price (or match value) may differ from (i.e., be better for the submitter, e.g., lower than a submitted buy price or higher than a submitted sell price) the limit price that is submitted, e.g., a price included in an incoming message, or a triggered limit price from a stop order. Whether or not the dynamic circuit breaker 404 is triggered may depend on whether the message full trades or partially trades, and at which price the trades occur.

In an embodiment, the dynamic circuit breaker 404 tracks price changes/movements based upon a participant type. As an example, price movements from orders received from market makers may be tracked differently then market takers. Different participant types may place orders that are more or less in line with an expected market. Market makers, for example, may be typically less likely to place orders that would disrupt the market integrity. Market makers may be designated as authorized participants that are authorized by the exchange to submit transactions which may entirely, or to a defined extent, exceed or otherwise bypass the dynamic circuit breaker 404. The dynamic circuit breaker 404 may store a watchlist of types that define the different types of participants, e.g., makers or takers, allowed to exceed or bypass the dynamic circuit breaker 404, as well as the extent thereto, e.g., the allowable price movements they may cause without triggering the dynamic circuit breaker 404. The dynamic circuit breaker 404 may store a list of specifically authorized participants, and associated thresholds, to be used in addition to or in lieu of general categories of authorized participants. It will be appreciated that if the only authorized category of participants are market makers, such authorization may be built in to the disclosed embodiments as opposed to using a watchlist. This may be accomplished via a designator or identifier of the market participant which accompanies their order and identifies them as a market maker. Alternatively, the system 400 may simply dynamically determine that a trader placing an order at a price level where there is no currently resting order is a market maker, at least for that order.

The dynamic circuit breaker 404 is configured to dynamically define an upper limit and a lower limit (or range of values) for a value included in an incoming electronic data transaction request message as a function of values of the electronic data transaction request messages identified during a rolling lookback window. The dynamically defined reference values, e.g., the upper and lower limit, may be set as follows.

Each product is assigned a relative value such as a fraction or percentage. A variant is calculated using, for example, the assigned percentage and the product's previous settlement. In an example, if the percentage was 10% and the previous settlement was 1000, the variant would be 100. The variant may be used through a session. The percentage may be set by a regulatory body or operators of the exchange. At market open, the dynamic circuit breaker 404 references the previous day's settlement to calculate the upper and lower limits. After the open, in an embodiment, the high and low prices used to calculate the upper and lower limits are identified using a rolling lookback window. The rolling lookback window splits a predetermined time into a series of intervals that drop off as a new interval is added. In an example, the predetermined time may be one hour. The hour may be split into 10 successive intervals of 6 minutes each. This provides 9 intervals of historical data and one incomplete interval that includes the current time. Other divisions or lengths of time may be used. When the current interval finishes (e.g., reaches 6 minutes) it is added to the stack of intervals and the oldest interval is dropped providing a rolling window of 60 minutes. The system identifies the high and low prices in each interval and uses the high and low prices to calculate the upper and lower limits. The rolling windows provide a dynamic calculation of the reference prices, e.g., the high and low prices that focuses on recent events.

The dynamic circuit breaker 404 parameters and controls are configurable by an administrator of the system 400 for particular markets. For example, the rolling lookback window may be set to one hour or may be shorter or longer depending on the type of market and the amount of volume. The percentage may also be adjusted to allow for larger or smaller possible swings.

The dynamic circuit breaker 404 is configured to detect that an incoming electronic data transaction request message is outside the range defined by the dynamically calculated upper limit and the lower limit. The dynamic circuit breaker 404 may check the submitted value, trade value, or both, depending on whether the message will fully trade (e.g., all of the quantity associated with a message matches an order resting on the books), partially trade (e.g., only some, but not all, of the quantity associated with a message matches an order resting on the books), or not trade (e.g., none of the quantity associated with a message matches an order resting on the books, and accordingly all of the quantity associated with the message is added as an order resting on the books). In one embodiment, if the dynamic circuit breaker 404 checks the trade or match value, the dynamic circuit breaker 404 checks the trade or match value against the range of values including the upper and lower limits. If the system checks the match value, the system checks the message value against an upper limit if the transaction is a buy, and the system checks the match value against a lower limit if the transaction is a sell. In an embodiment, the dynamic circuit breaker 404 is configured to also check orders against the market participant or type of market participant. Certain conditions may automatically trigger the dynamic circuit breaker 404 or may be exempted even if the message has a value outside the range of values. For example, the dynamic circuit breaker 404 may exempt certain types such as market makers from triggering the dynamic circuit breaker 404.

Once triggered, the dynamic circuit breaker 404 is configured to transition the system 400 into a pre-open state for a predetermined period, thereby preventing the match engine 402 from matching incoming electronic data transaction request messages. When in pre-open, the market operates according to pre-open rules as set by the exchange. During pre-open, order entry, modification, and cancellation of orders is allowed. No order matching is performed. Market orders with protection, market limit orders, fill and kill, and fill or kill orders are disallowed. In addition, mass quote messages are also not allowed. While the market is in the pre-open state, a timer is activated that determines the length of time the market will be in pre-open. The length of the timer may vary according to the market, market activity, or may be based on pre-set rules. In addition, a counter is activated that counts a number of times the price verification will be performed at the end of the pre-open. In an embodiment, a price range or expanded price range is determined for verification of the price value. When time has elapsed, verification is performed on the calculated price value. If the price is inside the range or expanded range, the market re-opens. If the price is not within the range or expanded range, the market may be placed back in pre-open and await another price verification. This process may repeat a number of times until the counter reaches a maximum number of verifications that has been set by the system. After a maximum number of verifications, the market may be halted for the trading day or other actions may be performed.

In an embodiment, the market stays in the pre-open state for a fixed period of time, e.g., two minutes. In another embodiment, the market may be placed in pre-open as was described above, for a limited time period that may be configurable, may be a static or dynamic value, and may vary among markets. In one embodiment, if during the pre-open state, additional conditions, such as whether the market is recovering to a normal operating state or not, are met, the time limit for staying in the pre-open state may be extended or cut short. In an example, if after 30 seconds in the pre-open state, incoming orders have re-established the market in a stable state, the market may be transitioned out of the pre-open state. In this way, if the market was disrupted by a single erroneous order, the market would not stay in pre-open for the entire two minutes, but would instead quickly re-open.

The dynamic circuit breaker 404 may also generate an action when triggered. The action may include transmission of an alert to an operator of the exchange, such as the GCC of the CME, traders of the product, or a combination thereof. Alerts may be sent as market data. Where the market is placed in a pre-open state, the alert may further advise the recipient of the state of the market. A subsequent message may then be sent when the market is to be taken out of the pre-open early or if the pre-open is extended. Alternatively, or in addition thereto, the action may include permanent or temporary enablement of trading opportunities for the product in a different market. For example, implied markets for which the current product may be a leg, etc. may be enabled to create additional matching opportunities, i.e., additional liquidity. Other actions may include enabling other additional liquidity, i.e., trading opportunities, for the particular product. Alternatively, or in addition thereto, the action may include permanent or temporary prevention of trading of the product at a price outside of a price limit, e.g., a ceiling or floor. If the detected extreme movement is downward, the limit may set as a limit below which trading is not allowed, e.g., a floor. Alternatively, if the detected extreme movement of the market is upward, the limit may be set as a limit above which trading is not allowed, e.g., a ceiling. In one embodiment, if orders to trade are subsequently received substantially close to, or at, or otherwise within a threshold of, the limit, the limit may be periodically raised (or lowered), such as after a defined delay period, to gradually allow a market, intent on reaching a particular price, to eventually reach the price in a controlled manner, e.g., the market is slowed down.

Because market participants may not be aware that a product or an instrument is in pre-open due to the large volume of messages sent over an electronic trading system or because the market participants are no longer trading, the present system and method also may encompass independent communication systems to convey information, warnings, or alerts about an instrument in a pre-open state. Such systems can include devices that send and/or receive messages via telecommunication or wireless links such as portable phones, personal digital assistants ("PDAs"), and/or electronic mail devices, devices that send and/or receive images and can print them on a tangible media such as faxes, etc. Preferably, these systems make market participants aware of the state of the market in a narrow timeframe. It will be appreciated that the length of time for which the market may be temporarily held in a pre-open state is implementation dependent and may be configurable, statically or dynamically, and further may vary from market to market. Once the market is re-opened, or otherwise taken out of pre-open state, the disclosed embodiments may be re-enabled to continue monitoring the market as described herein.

When in pre-open, the market operates according to pre-open rules as set by the exchange. During pre-open, order entry, modification, and cancelation of orders is allowed. No order matching is performed. Market orders with protection, market limit orders, fill and kill, and fill or kill orders are disallowed. In addition, mass quote messages are also not allowed. At the end of the pre-open state, order entry is allowed, although modification and cancellation are not allowed. Pre-open orders are then resolved following IOP determination. Trades are sent. If applicable, the market is then transitioned to open and order matching starts again.

The IOP may reflect the price the instrument would be trading at if the market were open. Placing an instrument in the pre-open state allows market participants to enter additional orders that adjust the IOP to a level that reflects buyers competing with other buyers and sellers vying against other sellers. The present embodiments may temporarily suspend trading until the market is adjusted within a threshold range, or when a period of time lapses. The period of time may vary in length in relation to the time of day, the product traded, market volatility and/or any other relevant market condition or combination of market conditions. Similarly, the threshold range may vary by the product and/or the time of day. It will be appreciated that the IOP determined when the market is taken out of the pre-open state, or a sampled, derived or measured value thereof, may be used as the initial value(s) for setting limits by the disclosed embodiments upon resumption of trading.

The dynamic circuit breaker 404 may be configured to calculate the pre-open value (e.g., the IOP) at the end of the pre-open state. The pre-open value may be calculated using different mechanisms. The pre-open value may be calculated as a function of received values during the pre-open state. In an embodiment, calculating the pre-open value involves following a set hierarchy of actions. The pre-open value is the price value that is calculated using whichever following action applies to the order book in question. First, if possible, the maximum matching quantity at a price level is determined. Second, the minimum non-matching quantity is determined. The highest price is determined if non-matching quantity is on the buy side for all prices. The lowest price is determined if non-matching quantity is on the sell side for all prices. Finally, the closest price to the settlement price (reference price) is determined. Different mechanisms may be used for calculating the pre-open value.

The dynamic circuit breaker 404 is configured to re-open the electronic data transaction processing system using the calculated pre-open price, thereby allowing the match engine 402 to match incoming electronic data transaction request messages. After open, the dynamic circuit breaker 404 resets and begins monitoring the incoming requests until the dynamic circuit breaker 404 is tripped again. In an embodiment, the limits are adjusted as if the market was at open again. This allows better range checking after an event. For example, using a static circuit breaker, an event to the upside would lower the downside range, thereby, limiting a major price movement beyond the price movement range.

Figure 5:
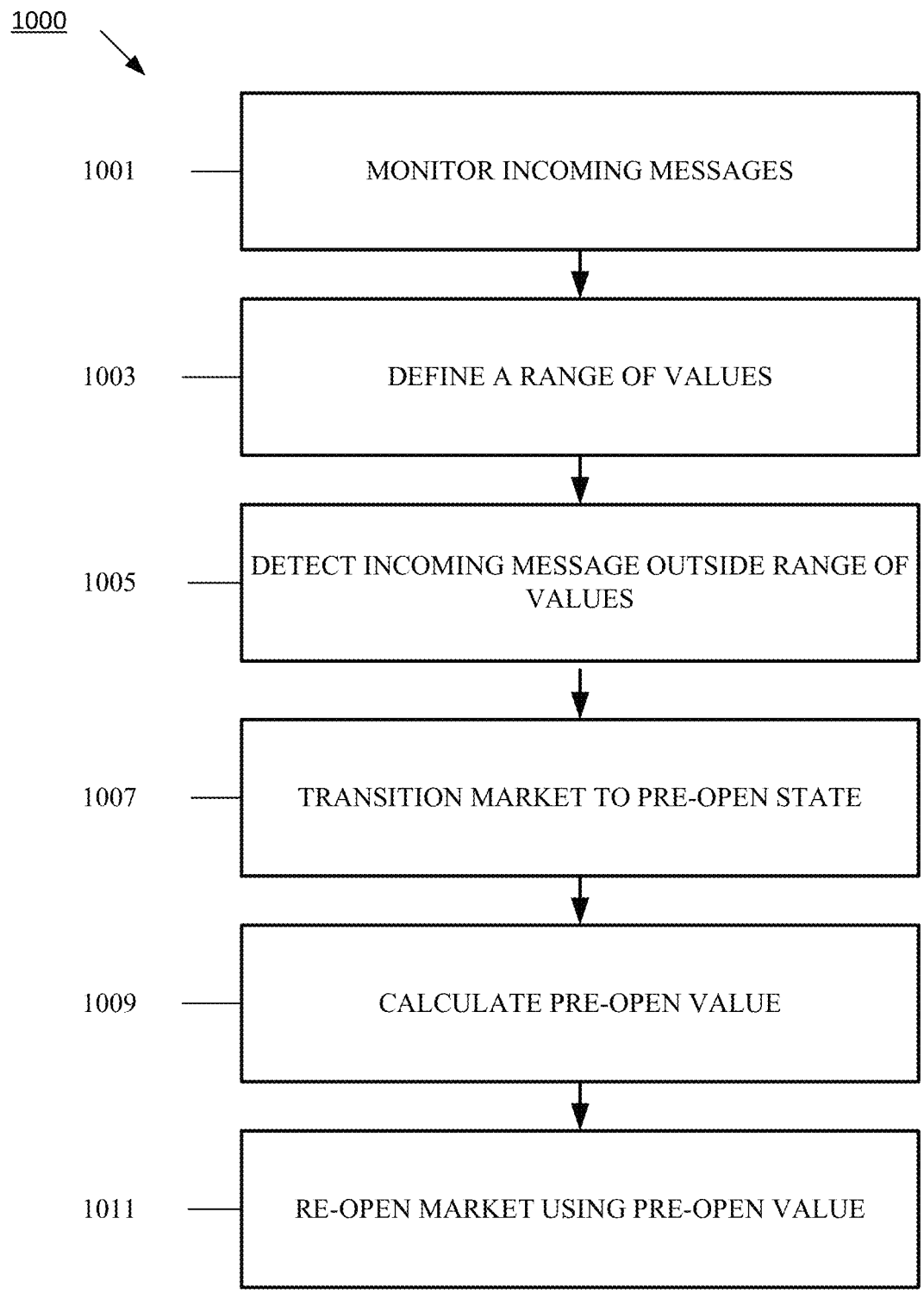
FIG. 5 depicts an example method for controlling an operation of a match engine with a market integrity processor.

FIG. 5 illustrates an example flowchart of an example computer implemented method 1000 of the operation of the system 400. Embodiments may involve all, more or fewer actions than the illustrated operations. The operations may be performed in the order or sequence shown, or in a different sequence. The operations may be performed simultaneously, or in a parallel or overlapping fashion. The method may be performed by processing logic that may comprise hardware (circuitry, dedicated logic, etc.), software, or a combination of both. In one example, the method is performed by the system 400 of FIG. 4, while in some other examples, some or all the method may be performed by another machine. The disclosed embodiments represent a technical solution to a technical problem of handling market disrupting messages in an electronic market where participants provide market orders with a speed that is impractical for a human to comprehend. The method improves upon current static circuit breakers by providing enhanced checking and actions.

At act 1001, a market integrity processor monitors incoming electronic data transaction request messages communicated to the hardware matching processor. An incoming transaction may be received at the system. The incoming transaction may be from, and therefore associated with, a market participant of an electronic market managed by an electronic trading system. The transaction may involve an order as extracted from a received message and may have an associated action. The actions may involve placing an order to buy or sell a financial product in the electronic market or modifying or deleting such an order. In an embodiment, the financial product may be based on an associated financial instrument which the electronic market is established to trade. In an embodiment, the action associated with the transaction is determined. For example, it may be determined whether the incoming transaction comprises an order to buy or sell a quantity of the associated financial instrument or an order to modify or cancel an existing order in the electronic market. Orders to buy or sell and orders to modify or cancel may be acted upon differently by the electronic market. In an embodiment, data relating to the received transaction is stored.

At act 1003, the market integrity processor dynamically defines a range of values as a function of values included with electronic data transaction request messages received during a rolling lookback window. The market integrity processor is configured to dynamically define reference values, e.g., an upper limit and a lower limit (or range of values), for a value included in an incoming electronic data transaction request messages as a function of values of the electronic data transaction request messages identified during the rolling lookback window. The upper and lower limit may be set as follows.

Each product is assigned a percentage. A variant is calculated using the assigned percentage and the product's previous settlement. In an example, if the percentage is 10% and the previous settlement value is 1200, the variant is 120. The variant may be used through a session. The percentage may be set by a regulatory body or operators of the exchange. At market open, the market integrity processor references the previous day's settlement to calculate the upper and lower limits. After the open, in an embodiment, the high and low prices used to calculate the upper and lower limits are identified using a rolling lookback window. The rolling lookback window splits a predetermined time into a series of intervals that drop off as a new interval is added. In an example, the predetermined time may be an hour. The hour may be split into 10 successive intervals of 6 minutes each, 12 successive intervals of 5 minutes each, or any other combination. In practice, when split into 10 intervals, there are 9 intervals of historical data and one incomplete interval that includes the present time. When the current interval finishes (e.g., reaches 6 minutes) it is added to the stack of intervals and the most distant interval is dropped. The system identifies the high and low prices in each interval and uses the high and low prices to calculate the upper and lower limits. The rolling windows provide a dynamic calculation of the high and low prices that focuses on recent events.

Figure 7:
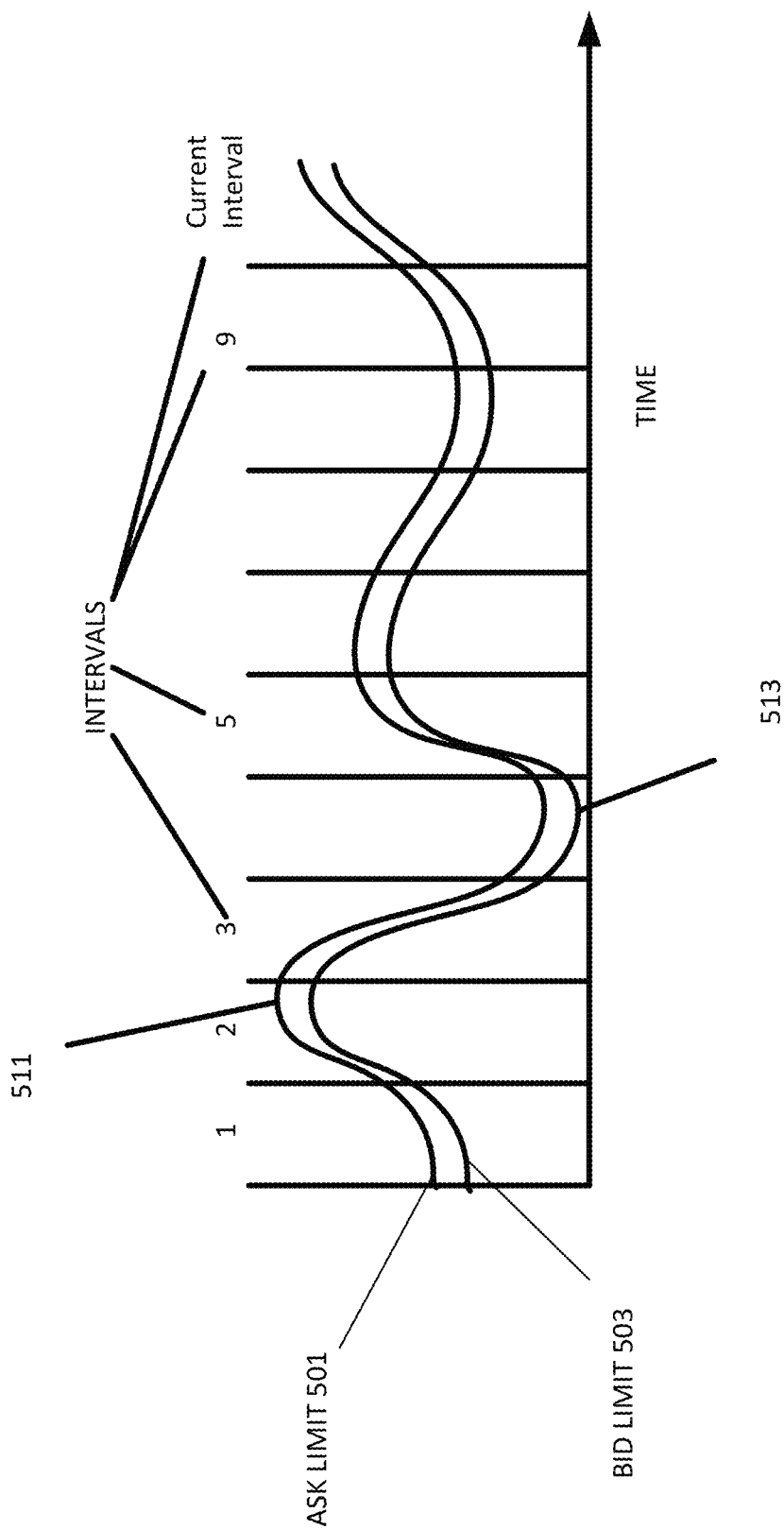
FIG. 7 depicts an example rolling lookback window for use in the system of FIG. 4.

FIGS. 6 and 7 depict an order book and an example rolling window for calculating an upper and lower limit by the market integrity processor. FIG. 6 depicts an example order book 500 including an ask limit 501 and a bid limit 503. The ask limit 501 and the bid limit 503 may be used to define the high and low prices in each interval. Additionally, or alternatively, the low trade or high trade for the interval may be used instead of the ask limit 501 and bid limit 503, respectively. As depicted in FIG. 6, the ask limit is 993 and the bid limit is 991. Referring to FIG. 7, the ask limit 501 and bid limit 503 are tracked across the rolling period (here depicted as 9 intervals+the current interval, each lasting 6 minutes for an hour-long rolling window). When the current interval ends, a new interval begins, and the oldest interval is dropped off the stack of intervals.

The market integrity processor identifies the highest ask limit 501 and the lowest bid limit 503 for each interval and stores the values in a memory. The values do not change once identified. For example, the highest ask limit 501 for interval 2 will always be the same once the interval has closed and has been added to the stack. To calculate the upper and lower limits, the market integrity processor identifies the highest ask limit 501 of the 9 possible values (one for each interval) and the lowest bid limit 504 of the 9 possible values (one for each interval). As depicted the highest ask limit 511 is from interval 2 and the lowest bid limit 513 is from interval 3. These are the values used to calculate the upper and lower limits. When the current interval closes, the market integrity processor drops the oldest interval (1) off the stack and checks the high and lows from the just closed interval. At some point in the future, interval 2 and interval 3 will both drop out of the rolling window and the market integrity processor will identify a new high and low respectively to calculate the upper and lower limits.

At act 1005, the market integrity processor detects that an incoming electronic data transaction request message contains a value outside the range of values. The market integrity processor may check the submitted value, trade value, or both, depending on whether the message will fully trade (e.g., all of the quantity associated with a message matches an order resting on the books), partially trade (e.g., only some, but not all, of the quantity associated with a message matches an order resting on the books), or not trade (e.g., none of the quantity associated with a message matches an order resting on the books, and accordingly all of the quantity associated with the message is added as an order resting on the books). In one embodiment, if the market integrity processor checks the trade or match value, the market integrity processor checks the match value against both a high threshold (e.g., a ceiling value) and a low threshold (e.g., a floor value). If the system checks the message value, the system checks the match value against a high threshold if the transaction is a buy, and the system checks the match value against a low threshold if the transaction is a sell. In an embodiment, the market integrity processor is configured to also check orders against the market participant or type of market participant. Certain conditions may automatically trigger the market integrity processor or may be exempted even if the message has a value outside the range of values. For example, the market integrity processor may exempt certain types such as market makers from triggering the market integrity processor.

At act 1007, the market integrity processor transitions the electronic data transaction processing system into a pre-open state for a predetermined period, thereby preventing the hardware matching processor from matching incoming electronic data transaction request messages but allowing incoming electronic data transaction request messages to be received. When in pre-open, the market operates according to pre-open rules as set by the exchange. During pre-open, order entry, modification, and cancellation of orders is allowed. No order matching is performed. Market orders with protection, market limit orders, fill and kill, and fill or kill orders are disallowed. In addition, mass quote messages are also not allowed. While the market is in the pre-open state, a timer is activated that determines the length of time the market will be in pre-open. The length of the timer may vary according to the market, market activity, or based on pre-set rules. In addition, a counter is activated that counts a number of times a price verification will be performed at the end of the pre-open. In an embodiment, a price range or expanded price range is determined for verification of the price value. When time has elapsed, price verification is performed on the calculated price value. If the price is inside the range or expanded range, the market re-opens. If the price is not within the range or expanded range, the market may be placed back in pre-open and await another price verification. This process may repeat a number of times until the counter reaches a maximum number of verifications that has been set by the system. At this point, the market may be halted for the trading day or other actions may be performed.

In an embodiment, the market stays in the pre-open state for two minutes. In another embodiment, the market may be placed in pre-open as was described above, for a limited time period which may be configurable, may be a static or dynamic period of time, and/or may vary among markets. In one embodiment, if during the pre-open state additional conditions, such as whether the market is recovering to a normal operating state or not as the timer state is nearing an end, are met, the time limit for staying in the pre-open state may be extended or cut short. In an example, if after 30 seconds in the pre-open state, incoming orders have re-established the market in a stable state, the market may be transitioned out of pre-open. In this way, if the market was disrupted by a single erroneous order, the market would not stay in pre-open for the entire two minutes, but rather immediately re-open.

As explained above, when in the pre-open state, the market operates according to pre-open rules as set by the exchange. During pre-open, order entry, modification, and cancellation of orders is allowed. No order matching is performed. Market orders with protection, market limit orders, fill and kill, and fill or kill orders are disallowed. In addition, mass quote messages are also not allowed. At the end of the pre-open state, order entry is allowed, although modification and cancellation are not allowed. Pre-open orders are then resolved following a pre-open value determination. Trades are sent. If applicable, the market is then transitioned to open and order matching starts again.

At act 1009, the market integrity processor calculates a pre-open value at the end of the pre-open state. The pre-open value may be calculated using different mechanisms. In an embodiment, calculating the pre-open value involves the following actions where the pre-open value is the price value that is calculated using whichever action applies to the order book in question. First, if possible, the maximum matching quantity at a price level is determined. Second, the minimum non-matching quantity is determined. The highest price is determined if non-matching quantity is on the buy side for all prices. The lowest price is determined if non-matching quantity is on the sell side for all prices. Finally, the closest price to the settlement price (reference price) is determined. Different mechanisms may be used for calculating the pre-open value.

At act 1011, the market integrity processor re-opens the electronic data transaction processing system at the calculated pre-open price, thereby allowing the hardware matching processor to match incoming electronic data transaction request messages. After open, the market integrity processor resets and begins monitoring the incoming requests until the market integrity processor is tripped again. In an embodiment, the limits are adjusted as if the market was at open again. This allows better range checking after an event. For example, using a static circuit breaker, an event to the upside would lower the downside range, limiting a major price movement beyond the price movement range.

CONCLUSION

The illustrations of the embodiments described herein are intended to provide a general understanding of the structure of the various embodiments. The illustrations are not intended to serve as a complete description of all the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the described embodiments should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all the features of any of the disclosed embodiments. Thus, the following claims are incorporated into the Detailed Description, with each claim standing on its own as defining separately claimed subject matter.

It is therefore intended that the foregoing detailed description be regarded as illustrative rather than limiting, and that it be understood that it is the following claims, including all equivalents, that are intended to define the spirit and scope of this invention.

The invention claimed is:

1. A computer implemented method comprising:
monitoring, by a processor coupled with a hardware matching engine which processes electronic data transaction request messages received thereby so as to attempt to transact them, electronic data transaction request messages communicated to the hardware matching engine, each including a value;
defining, subsequent to an end of an interval by the processor, upper and lower threshold values as a function of the values included in the electronic data transaction request messages monitored during the interval;
detecting, by the processor, that a subsequently monitored electronic data transaction request message includes a value which exceeds or falls below the defined upper or lower threshold values, respectively and, based thereon, preventing, by the processor, the hardware matching engine from processing the subsequently communicated electronic data transaction request message and any electronic data transaction request messages subsequently communicated thereto, while allowing electronic data transaction request messages to be stored by the hardware matching engine in a memory coupled therewith, until an occurrence of an event;
calculating, by the processor upon occurrence of the event, a transaction value based on at least a subset of the electronic transaction requests stored in the memory that would have been transacted but for the hardware matching engine being prevented from processing; and
allowing, by the processor upon occurrence of the event, the hardware matching engine to resume processing electronic data transaction request messages, initially using the calculated transaction value.

2. The computer implemented method of claim 1, wherein the interval comprises a rolling lookback window.

3. The computer implemented method of claim 1, wherein the processor is external to the hardware matching engine.

4. The computer implemented method of claim 1, further comprising repeating the defining, by the processor, upon an end of each subsequent occurrence of the interval, the upper and lower threshold values dynamically varying based thereon.

5. The computer implemented method of claim 1, further comprising determining, prior to the occurrence of the event, that the calculated transaction value does not exceed a threshold and, based thereon, allowing, by the processor prior to occurrence of the event, the hardware matching engine to resume processing electronic data transaction request messages.

6. The computer implemented method of claim 1, wherein the electronic data transaction request messages are for a first product, the method further comprising preventing, by the processor, the hardware matching engine from processing subsequently communicated electronic data transaction request messages for a second product related to the first product, wherein the hardware matching engine is not prevented from processing subsequently communicated electronic data transaction request messages for products unrelated to the first or second products.

7. The computer implemented method of claim 1, wherein each of the electronic data transaction request messages is communicated to the hardware matching engine by one of a plurality of participants, each of which is characterized by a type, the detecting further comprises identifying the type of participant which communicated the electronic data transaction request message that contains a value which exceeds or falls below the upper or lower threshold values respectively and when the type of participant is a first type, not preventing, by the processor, the hardware matching engine from processing the subsequently communicated electronic data transaction request message and any electronic data transaction request messages subsequently communicated thereafter.

8. The computer implemented method of claim 1, wherein the detecting further comprises determining that the electronic data transaction request message that contains a value which exceeds or falls below the upper or lower threshold values respectively will not transact with a previously received but not yet satisfied electronic data transaction request message and, based thereon, not preventing, by the processor, the hardware matching engine from matching the subsequently communicated electronic data transaction request message and any electronic data transaction request messages subsequently communicated thereafter.

9. The computer implemented method of claim 1, wherein the event comprises an elapse of a predetermined period of time, wherein a length of the predetermined period of time is determined as a function of the values included in the electronic data transaction request messages received prior to the occurrence of the event.

10. The computer implemented method of claim 1, wherein the event comprises an elapse of a predetermined period of time, wherein a length of the predetermined period of time is fixed.

11. The computer implemented method of claim 1, wherein implied orders are included in the calculation of the transaction value.

12. The computer implemented method of claim 1, wherein the upper and lower threshold values are calculated as a function of a high trade or ask limit plus a predetermined variant and a low trade or bid limit plus the predetermined variant, wherein the high trade, ask limit, low trade, and bid limit are identified from electronic data transaction request messages received during the defined plurality of consecutive time intervals.

13. A system comprising:
a processor, coupled with a hardware matching engine which processes electronic data transaction request messages received thereby so as to attempt to transact them, operative to monitor electronic data transaction request messages communicated to the hardware matching engine, each including a value;
the processor further operative to define, subsequent to an end of an interval by the processor, upper and lower threshold values as a function of the values included in the electronic data transaction request messages monitored during the interval;
the processor further operative to detect that a subsequently monitored electronic data transaction request message includes a value which exceeds or falls below the defined upper or lower threshold values, respectively and, based thereon, prevent the hardware matching engine from processing the subsequently communicated electronic data transaction request message and any electronic data transaction request messages subsequently communicated thereto, while allowing electronic data transaction request messages to be stored by the hardware matching engine in a memory coupled therewith, until an occurrence of an event;

the processor further operative to calculate, upon occurrence of the event, a transaction value based on at least a subset of the electronic transaction requests stored in the memory that would have been transacted but for the hardware matching engine being prevented from processing; and the processor further operative to allow, upon occurrence of the event, the hardware matching engine to resume processing electronic data transaction request messages, initially using the calculated transaction value.

14. The system of claim 13, wherein the interval comprises a rolling lookback window.

15. The system of claim 13, wherein the processor is external to the hardware matching engine.

16. The system of claim 13, wherein the processor is further operative to repeat the calculation upon an end of each subsequent occurrence of the interval, the upper and lower threshold values dynamically varying based thereon.

17. The system of claim 13, wherein the processor is further operative to determine, prior to the occurrence of the event, that the calculated transaction value does not exceed a threshold and, based thereon, allow, prior to occurrence of the event, the hardware matching engine to resume processing electronic data transaction request messages.

18. The system of claim 13, wherein the electronic data transaction request messages are for a first product, the processor being further operative to prevent the hardware matching engine from matching subsequently communicated electronic data transaction request messages related for a second product related to the first product, wherein the hardware matching engine is not prevented from processing subsequently communicated electronic data transaction request messages for a product unrelated to the first or second products.

19. The system of claim 13, wherein each of the electronic data transaction request messages is communicated to the hardware matching engine by one of a plurality of participants, each of which is characterized by a type, the processor being further operative to identify the type of participant which communicated the electronic data transaction request message that contains a value which exceeds or falls below the upper or lower threshold values respectively and when the type of participant is a first type, not prevent the hardware matching engine from processing the subsequently communicated electronic data transaction request message and any electronic data transaction request messages subsequently communicated thereafter.

20. The system of claim 13, wherein the processor is further operative to determine that the electronic data transaction request message that contains a value which exceeds or falls below the upper or lower threshold values respectively will not transact with a previously received but not yet satisfied electronic data transaction request message and, based thereon, not prevent the hardware matching engine from processing the subsequently communicated electronic data transaction request message and any electronic data transaction request messages subsequently communicated thereafter.

21. The system of claim 13, wherein the event comprises an elapse of a predetermined period of time, wherein a length of the predetermined period of time is determined as a function of the values included in the electronic data transaction request messages received prior to the occurrence of the event.

22. The system of claim 13, wherein the event comprises an elapse of a predetermined period of time, wherein a length of the predetermined period of time is fixed.

23. The system of claim 13, wherein implied orders are included in the calculation of the transaction value.

24. The system of claim 13, wherein the upper and lower threshold values are calculated as a function of a high trade or ask limit plus a predetermined variant and a low trade or bid limit plus the predetermined variant, wherein the high trade, ask limit, low trade, and bid limit are identified from electronic data transaction request messages received during the defined plurality of consecutive time intervals.

25. A system comprising:
a processor and a memory coupled therewith, the processor further coupled with a hardware matching engine which processes electronic data transaction request messages received thereby so as to attempt to transact them, the memory storing computer executable instructions that, when executed by the processor, cause the processor to:
monitor electronic data transaction request messages communicated to the hardware matching engine, each including a value;
define, subsequent to an end of an interval by the processor, upper and lower threshold values as a function of the values included in the electronic data transaction request messages monitored during the interval;
detect that a subsequently monitored electronic data transaction request message includes a value which exceeds or falls below the defined upper or lower threshold values, respectively and, based thereon, prevent the hardware matching engine from processing the subsequently communicated electronic data transaction request message and any electronic data transaction request messages subsequently communicated thereto, while allowing electronic data transaction request messages to be stored by the hardware matching engine in a memory coupled therewith, until an occurrence of an event;
calculate, upon occurrence of the event, a transaction value based on at least a subset of the electronic transaction requests stored in the memory that would have been transacted but for the hardware matching engine being prevented from processing; and
allow, upon occurrence of the event, the hardware matching engine to resume processing electronic data transaction request messages, initially using the calculated transaction value.

* * * * *